US012572915B1

(12) United States Patent (10) Patent No.: US 12,572,915 B1
Wetzel (45) Date of Patent: Mar. 10, 2026

(54) CASH HANDLING DEVICE OPERATION FOR PHYSICAL CASH PAYOUTS

(71) Applicant: G4S Retail Solutions (USA) Inc., Jupiter, FL (US)

(72) Inventor: David Wetzel, Jupiter, FL (US)

(73) Assignee: G4S Retail Solutions (USA) Inc., Jupiter, FL (US)

( * ) Notice: Subject to any disclaimer, the term of this patent is extended or adjusted under 35 U.S.C. 154(b) by 287 days.

(21) Appl. No.: 18/309,100

(22) Filed: Apr. 28, 2023

(51) Int. Cl.
| *G06Q 20/20* | (2012.01) |
| *G06V 30/14* | (2022.01) |
| *G07G 1/00* | (2006.01) |

(52) U.S. Cl.
CPC ........... *G06Q 20/202* (2013.01); *G06V 30/14* (2022.01); *G07G 1/0009* (2013.01)

(58) Field of Classification Search
CPC ........ G06Q 40/00; G06Q 20/00; G06Q 20/10; G06Q 20/202; G07F 19/00; G07D 11/00; G06F 17/00; G07C 3/00; G06V 30/14; G07G 1/0009
See application file for complete search history.

(56) References Cited

U.S. PATENT DOCUMENTS

| 5,553,320 A | 9/1996 | Matsuura |
| 7,610,215 B1 | 10/2009 | Folk et al. |
| 7,635,085 B2 | 12/2009 | Brown et al. |
| 7,900,829 B1 * | 3/2011 | Folk ...................... G06Q 30/00 |
| | | 235/380 |

| 7,940,176 B2 | 5/2011 | Bohen et al. |
| 7,950,512 B2 | 5/2011 | Folk et al. |
| 7,954,699 B1 | 6/2011 | Sanders et al. |
| 8,011,581 B1 | 9/2011 | Folk et al. |
| 8,019,663 B1 | 9/2011 | Bohen et al. |
| 8,025,214 B1 | 9/2011 | Folk et al. |
| 8,032,415 B2 | 10/2011 | Sanders et al. |
| 8,047,427 B2 | 11/2011 | Sanders et al. |
| 8,056,305 B1 | 11/2011 | Folk et al. |
| 8,096,398 B2 | 1/2012 | Folk et al. |
| 8,117,127 B1 | 2/2012 | Sanders et al. |

(Continued)

OTHER PUBLICATIONS

United States Patent and Trademark Office, Unpublished U.S. Appl. No. 12/241,397.

(Continued)

*Primary Examiner* — Florian M Zeender
*Assistant Examiner* — Milena Racic
(74) *Attorney, Agent, or Firm* — Alston & Bird LLP

(57) ABSTRACT

Physical actions across a variety of cash based systems, such as cash handling devices (CHDs) and register tills, within an establishment may be remotely monitored, tracked, and initiated based at least in part on simulated interactions generated by a monitoring server. These actions may facilitate a user's physical access to cash for securely handling physical cash payouts. Payout data is received for a physical cash payout for a user that includes an identifier for a register till within an establishment. A simulated interaction is generated based at least in part on the payout data. The simulated interaction includes a simulated pick-up and payout transaction between the identified register till and a CHD. The register till is then caused to dispense cash to satisfy the physical cash payout or unlock access to cash stored within the at least one register till.

20 Claims, 13 Drawing Sheets

100

(56)  References Cited

U.S. PATENT DOCUMENTS

| | | | |
|---|---|---|---|
| 8,141,772 B1 | 3/2012 | Folk et al. | |
| 8,157,078 B1 | 4/2012 | Folk et al. | |
| 8,172,067 B1 | 5/2012 | Folk et al. | |
| 8,175,970 B1 | 5/2012 | Mon et al. | |
| 8,177,132 B1 | 5/2012 | Bohen et al. | |
| 8,181,854 B1 | 5/2012 | Folk et al. | |
| 8,181,856 B1 | 5/2012 | Folk et al. | |
| 8,196,826 B2 | 6/2012 | Folk et al. | |
| 8,201,680 B1 | 6/2012 | Folk et al. | |
| 8,210,429 B1 | 7/2012 | Bohen et al. | |
| 8,214,257 B1 | 7/2012 | Folk et al. | |
| 8,225,988 B1 | 7/2012 | Bohen et al. | |
| 8,227,936 B1 | 7/2012 | Folk et al. | |
| 8,260,669 B1* | 9/2012 | Folk | G07D 11/60 |
| | | | 235/7 R |
| 8,272,563 B1 | 9/2012 | Folk et al. | |
| 8,274,364 B1 | 9/2012 | Bohen et al. | |
| 8,327,995 B1 | 12/2012 | Folk et al. | |
| 8,346,640 B1 | 1/2013 | Sanders et al. | |
| 8,387,874 B1 | 3/2013 | Bohen et al. | |
| 8,396,278 B2 | 3/2013 | Jones et al. | |
| 8,401,965 B2 | 3/2013 | Johnson et al. | |
| 8,407,119 B2 | 3/2013 | Folk et al. | |
| 8,430,303 B1 | 4/2013 | Sanders et al. | |
| 8,517,257 B1 | 8/2013 | Folk et al. | |
| 8,556,166 B1 | 10/2013 | Folk et al. | |
| 8,561,885 B1 | 10/2013 | Folk et al. | |
| 8,571,948 B1 | 10/2013 | Nichols et al. | |
| 8,600,842 B1 | 12/2013 | Sanders et al. | |
| 8,601,771 B2 | 12/2013 | Folk et al. | |
| 8,602,295 B1 | 12/2013 | Sanders et al. | |
| 8,640,945 B1 | 2/2014 | McCormick | |
| 8,781,903 B1 | 7/2014 | Bohen et al. | |
| 8,812,366 B2 | 8/2014 | Folk et al. | |
| 8,812,394 B1 | 8/2014 | Folk et al. | |
| 8,909,547 B2 | 12/2014 | Bohen et al. | |
| 8,925,797 B1 | 1/2015 | Bohen et al. | |
| 9,004,352 B1 | 4/2015 | Graef et al. | |
| 9,064,366 B1 | 6/2015 | Folk et al. | |
| 9,070,125 B1 | 6/2015 | Folk et al. | |
| 9,098,960 B1 | 8/2015 | Folk et al. | |
| 9,311,671 B2* | 4/2016 | Folk | H04W 4/024 |
| 9,547,848 B2 | 1/2017 | Folk et al. | |
| 9,697,493 B2 | 7/2017 | Folk et al. | |
| 9,715,793 B1 | 7/2017 | Brancaccio | |
| 10,977,889 B1 | 4/2021 | McCabe et al. | |
| 11,188,910 B2 | 11/2021 | Yang | |
| 11,315,379 B1 | 4/2022 | Crandall et al. | |
| 11,403,210 B1* | 8/2022 | McCabe | G06Q 40/02 |
| 11,429,939 B1* | 8/2022 | Borunda | G06Q 20/10 |
| 11,615,665 B1 | 3/2023 | McCabe et al. | |
| 11,854,002 B2* | 12/2023 | Abidi | G06Q 20/20 |
| 2002/0074709 A1 | 6/2002 | Kanagawa | |
| 2005/0011721 A1 | 1/2005 | Armanini et al. | |
| 2005/0027626 A1 | 2/2005 | Garcia | |
| 2005/0289030 A1 | 12/2005 | Smith | |
| 2006/0253349 A1 | 11/2006 | Brooks, Jr. et al. | |
| 2009/0070263 A1 | 3/2009 | Davis et al. | |
| 2010/0131407 A1 | 5/2010 | Folk et al. | |
| 2011/0060639 A1 | 3/2011 | Garcia | |
| 2011/0258090 A1 | 10/2011 | Bosch et al. | |
| 2012/0073482 A1 | 3/2012 | Meeker et al. | |
| 2013/0191196 A1 | 7/2013 | Cecala | |
| 2013/0232064 A1 | 9/2013 | Bosch | |
| 2013/0346135 A1 | 12/2013 | Siemens et al. | |
| 2014/0074708 A1 | 3/2014 | Bellamy | |
| 2014/0279675 A1 | 9/2014 | Wiig et al. | |
| 2014/0353375 A1 | 12/2014 | Turocy et al. | |
| 2015/0199661 A1 | 7/2015 | Saoji et al. | |
| 2017/0061561 A1 | 3/2017 | Cha | |
| 2017/0193731 A1 | 7/2017 | Kim et al. | |
| 2017/0232300 A1 | 8/2017 | Tran et al. | |
| 2017/0286883 A1 | 10/2017 | Nail et al. | |
| 2018/0005193 A1 | 1/2018 | Crandall et al. | |
| 2018/0047239 A1 | 2/2018 | Niizuma | |
| 2018/0078843 A1 | 3/2018 | Tran et al. | |
| 2018/0144321 A1 | 5/2018 | Baar et al. | |
| 2018/0181935 A1 | 6/2018 | Johnson | |
| 2018/0218323 A1 | 8/2018 | Nguyen | |
| 2018/0240190 A1 | 8/2018 | Schumacher | |
| 2018/0293649 A1 | 10/2018 | Morgan et al. | |
| 2018/0300703 A1 | 10/2018 | Hiramatsu et al. | |
| 2019/0220839 A1 | 7/2019 | Oliynyk | |
| 2020/0402028 A1* | 12/2020 | Folk | G07F 19/203 |
| 2021/0056795 A1* | 2/2021 | Recine | G07D 11/40 |
| 2023/0206209 A1* | 6/2023 | Janiga | G06Q 20/1085 |
| | | | 705/16 |
| 2023/0281589 A1* | 9/2023 | Inokami | G07F 19/203 |
| | | | 705/17 |

OTHER PUBLICATIONS

United States Patent and Trademark Office, Office Action for U.S. Appl. No. 16/516,026, filed Jul. 9, 2020, (9 pages), U.S.

United States Patent and Trademark Office, NonFinal Office Action for U.S. Appl. No. 16/516,000, filed Aug. 13, 2020, (17 pages), U.S.

United States Patent and Trademark Office, NonFinal Office Action for U.S. Appl. No. 16/697,503, filed Sep. 29, 2020, (15 pages), U.S.

NonFinal Office Action for U.S. Appl. No. 16/906,056, dated Oct. 6, 2021, (16 pages), United States Patent and Trademark Office, USA.

Advisory Action for U.S. Appl. No. 16/516,000, dated Dec. 29, 2021, (5 pages), United States Patent and Trademark Office, USA.

NonFinal Office Action for U.S. Appl. No. 16/516,000, dated Jan. 25, 2022, (8 pages), United States Patent and Trademark Office, US.

Notice of Allowance and Fee(s) Due for U.S. Appl. No. 16/906,056, dated Apr. 27, 2022, (13 pages), United States Patent and Trademark Office, US.

NonFinal Office Action for U.S. Appl. No. 17/182,704, dated Jun. 17, 2022, (9 pages), United States Patent and Trademark Office, US.

NonFinal Office Action for U.S. Appl. No. 17/166,561, dated Oct. 14, 2022, (8 pages), United States Patent and Trademark Office, US.

Notice of Allowance and Fee(s) Due for U.S. Appl. No. 16/928,460, dated Feb. 1, 2023, (11 pages), United States Patent and Trademark Office, US.

* cited by examiner

Cash Payout – Travel

Reason | Training and Events

Payee | Name

Expense Capture

Additional Milage

Associate - Breakfast

ADD EXPENSE

Parking $50.00

Milage $1.90

Total $51.90

VERIFY EXPENSES

Cash Payout – Travel

Reason | Store Support - Store

Payee | Name

Expense Capture

Additional Milage

Associate - Breakfast

ADD EXPENSE

Associate Dinner $32.43

Milage $1.65

Total $34.08

VERIFY EXPENSES

800

850

1200

Cash Payout – Verification

Expense Totals

Milage

Associate - Breakfast

Manager Signature

Recipient Signature

SUBMIT EXPENSES

1350

1325

1300

CASH HANDLING DEVICE OPERATION FOR PHYSICAL CASH PAYOUTS

BACKGROUND

Brick-and-mortar commercial establishments, such as retail stores that accept cash payments for goods and services may periodically pay out physical cash for situations, such as advances for payroll, celebrations for employees, vendor payments, handling returns, providing cash back, among other circumstances. While necessary as a part of doing business, physical cash payouts can create difficulties with reconciliation and accountability of point-of-sale (POS) systems due to data logging inconsistencies or failures. The lack of accountability limits the detection of theft and abuse of discretionary funds, among other consequences. Traditionally, to improve accountability and the security of physical cash payouts, employees may be required to access physical cash from a CHD, as opposed to readily accessible register tills placed throughout a brick and mortar establishment. This leads operational inefficiencies that are magnified in large physical retail establishments where CHDs are separated from a large number of easily accessible register tills that are frequently in use. These establishments have historically been unable to reliably monitor, record, and facilitate physical cash payouts, which prevents the accessibility of physical cash payout operations among various other operational inefficiencies.

Through applied effort and ingenuity, various technical problems associated with historical cash payouts have been solved through embodiments as discussed herein.

BRIEF SUMMARY

Various embodiments are directed to automated systems and methods for simulating interactions between various networked devices within a brick-and-mortar establishment to facilitate efficient, secure, and accounted for cash payouts from one or more locations within the establishment.

Certain embodiments are directed to an automated system for simulating interactions between a CHD and one or more register tills for a physical cash payout, the automated system comprising one or more non-transitory memory storage areas and one or more processors collectively configured to: receive payout data for the physical cash payout for a user, wherein the payout data comprises at least one register till identifier corresponding to at least one register till of the one or more register tills; and generate, based at least in part on the payout data, a simulated interaction between the CHD and the at least one register till, wherein the simulated interaction comprises: (i) a simulated pick-up transaction for the at least one register till, wherein the simulated pick-up transaction reflects a pick-up operation from the at least one register till, and (ii) a simulated payout transaction for the CHD, wherein the simulated payout transaction reflects a payout operation from the CHD; and cause, based at least in part on the payout data, the at least one register till to: dispense cash to satisfy the physical cash payout or unlock access to cash stored within the at least one register till.

In certain embodiments, the one or more non-transitory memory storage areas and the one or more processors are further configured to transmit one or more cash dispensing instructions to the at least one register till to cause the at least one register till to: dispense cash to satisfy the physical cash payout or unlock access to cash stored within the at least one register till.

In certain embodiments, the one or more cash dispensing instructions identify access credentials, and wherein the one or more non-transitory memory storage areas and the one or more processors are further configured to generate access instructions that reflect the access credentials and transmit the access instructions to a mobile device. In certain embodiments, the payout data is associated with an organizational identifier, and wherein the one or more non-transitory memory storage areas and the one or more processors are further configured to: generate a payout data object based at least in part on the payout data and the simulated interaction; and store, using the organizational identifier, the payout data object in an encrypted data store.

In certain embodiments, receiving the payout data comprises causing, via a mobile device, a presentation of a plurality of user interfaces to the user, wherein each of the plurality of user interfaces corresponds to one or more payout criteria for validating the physical cash payout; and receiving the payout data from the mobile device in response to user input to the plurality of user interfaces.

In certain embodiments, the plurality of user interfaces comprise at least one verification user interface that displays a summary of the physical cash payout, a payor signature block, and a payee signature block, and wherein the payout data comprises verification data that reflects a payor signature entered via the payor signature block and a payee signature entered via the payee signature block.

In certain embodiments, the payout data comprises a user input payout value and image data that reflects an actual payout value, and wherein the one or more non-transitory memory storage areas and one or more processors are further configured to extract, using one or more optical character recognition models, the actual payout value from the image data; and verify, based at least in part on the actual payout value, the user input payout value.

In certain embodiments, the payout data comprises location data that reflects a start location and an end location for the physical cash payout, and wherein the one or more non-transitory memory storage areas and one or more processors are further configured to determine, based at least in part on map data, a covered distance between the start location and the end location; determine a payout value for the physical cash payout based at least in part on the covered distance; generate the simulated interaction based at least in part on the payout value; and cause, based at least in part on the payout value, the at least one register till to: dispense cash to satisfy the physical cash payout or unlock access to cash stored within the at least one register till.

In certain embodiments, the location data comprises current location data that reflects a user's current location, and wherein the current location data is generated by one or more location sensors of a mobile device.

In certain embodiments, the one or more non-transitory memory storage areas and one or more processors are further configured to determine the end location based at least in part on the current location data.

Certain embodiments are directed to a computer-implemented method for simulating interactions between a cash handling device (CHD) and one or more register tills for a physical cash payout, the computer-implemented method comprising: receiving payout data for the physical cash payout for a user, wherein the payout data comprises at least one register till identifier corresponding to at least one register till of the one or more register tills; generating, based at least in part on the payout data, a simulated interaction between the CHD and the at least one register till, wherein the simulated interaction comprises: (i) a simulated pick-up transaction for the at least one register till, wherein the simulated pick-up transaction reflects a pick-up operation from the at least one register till, and (ii) a simulated payout transaction for the CHD, wherein the simulated payout transaction reflects a payout operation from the CHD; and causing, based at least in part on the payout data, the at least one register till to: dispense cash to satisfy the physical cash payout or unlock access to cash stored within the at least one register till.

In certain embodiments, the receiving the payout data comprises causing, via a mobile device, a presentation of a plurality of user interfaces to the user, wherein each of the plurality of user interfaces corresponds to one or more payout criteria for validating the physical cash payout; and receiving the payout data from the mobile device in response to user input to the plurality of user interfaces.

In certain embodiments, the plurality of user interfaces comprise at least one verification user interface that displays a summary of the physical cash payout, a payor signature block, and a payee signature block, and wherein the payout data comprises verification data that reflects a payor signature entered via the payor signature block and a payee signature entered via the payee signature block.

In certain embodiments, the payout data comprises a user input payout value and image data that reflects an actual payout value, and wherein the computer-implemented method further comprises extracting, using one or more optical character recognition models, the actual payout value from the image data; and verifying, based at least in part on the actual payout value, the user input payout value.

Certain embodiments are directed to a computer program product comprising a non-transitory computer readable medium having computer program instructions stored therein, the computer program instructions when executed by a processor, cause the processor to receive payout data for a physical cash payout for a user, wherein the payout data comprises at least one register till identifier corresponding to at least one register till of one or more register tills within an establishment; generate, based at least in part on the payout data, a simulated interaction between the CHD and the at least one register till, wherein the simulated interaction comprises: (i) a simulated pick-up transaction for the at least one register till, wherein the simulated pick-up transaction reflects a pick-up operation from the at least one register till, and (ii) a simulated payout transaction for the CHD, wherein the simulated payout transaction reflects a payout operation from the CHD; and cause, based at least in part on the payout data, the at least one register till to: dispense cash to satisfy the physical cash payout or unlock access to cash stored within the at least one register till.

In certain embodiments, the computer program instructions, when executed by the processor, further cause the processor to transmit one or more cash dispensing instructions to the at least one register till to cause the at least one register till to: dispense cash to satisfy the physical cash payout or unlock access to cash stored within the at least one register till.

In certain embodiments, the one or more cash dispensing instructions identify access credentials, and the one or more non-transitory memory storage areas and the one or more processors are further configured to generate access instructions that reflect the access credentials and transmit the access instructions to a mobile device.

In certain embodiments, the payout data is associated with an organizational identifier, and the computer program instructions, when executed by the processor, further cause the processor to generate a payout data object based at least in part on the payout data and the simulated interaction; and store, using the organizational identifier, the payout data object in an encrypted data store.

In certain embodiments, the payout data comprises location data that reflects a start location and an end location for the physical cash payout, and the computer program instructions, when executed by the processor, further cause the processor to determine, based at least in part on map data, a covered distance between the start location and the end location; determine a payout value for the physical cash payout based at least in part on the covered distance; generate the simulated interaction based at least in part on the payout value; and cause, based at least in part on the payout value, the at least one register till to: dispense cash to satisfy the physical cash payout or unlock access to cash stored within the at least one register till.

In certain embodiments, the location data comprises current location data that reflects a user's current location, and wherein the current location data is generated by one or more location sensors of a mobile device.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
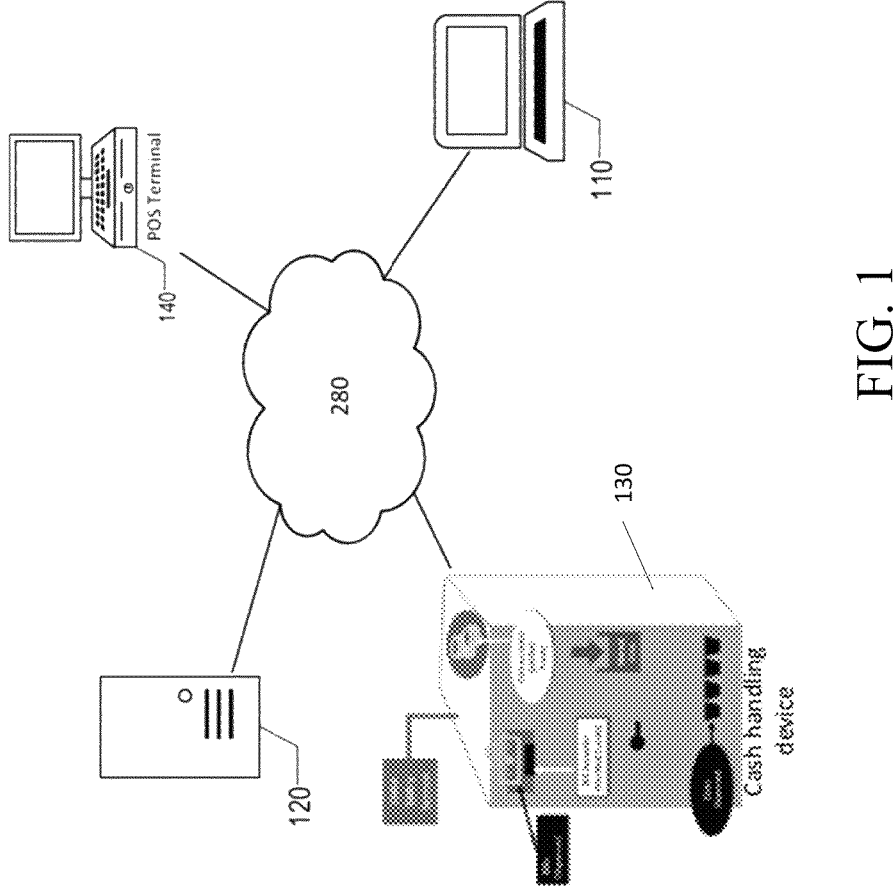
FIG. 1 provides an illustration of an exemplary computing ecosystem according to certain embodiments of the present disclosure.
Figure 1:

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Special purpose computing devices and machinery, such as CHDs, register tills, and point of sale terminals, are placed at various locations of brick-and-mortar establishments to handle cash flow throughout the course of business. These computing devices are specially configured to securely handle, track, and monitor real-time cash transactions in fast-paced, high throughput, environments. To enhance security and accountability of cash transactions, the computing devices are specifically configured to perform different functions. For example, a CHD may act as a centralized cash handler for a brick-and-mortar establishment, while register tills may act as transaction points throughout the establishment. To ensure cash accountability, the register tills are specifically designed to handle cash transactions only, whereas CHDs may handle business-related operations including the provisioning of cash for physical cash payouts. This separation of functions improves reconciliation and accountability of cash-based operations, but reduces the accessibility to cash in a brick-and-mortar establishment. Various embodiments of the present disclosure describe automated systems for addressing the cash inaccessibility problems caused by the specialized designs of cash-based computing devices. By doing so, the embodiments of the present disclosure provide an improvement over traditional cash-based computing devices that may be practically applied in a brick-and-mortar establishment to improve the security, monitoring, tracking, and accessibility of physical cash payouts.

More particularly, some embodiments of the present disclosure encompass automated systems for improving the accessibility of physical cash payouts in a brick-and-mortar establishment by simulating interactions between CHDs and register tills. As described herein, the various computing devices within an establishment may be configured for different purposes, which prevent some of the computing devices, such as register tills and/or associated POS terminals, from engaging in recurring business operations, such as physical cash payouts. Register tills, for example, are traditionally operated by POS terminals with software, firmware, and/or other control functionalities that are incapable of recognizing and/or distinguishing between types of business operations transactions to securely enable one-sided transactions, such as physical cash payouts. However, retailers and other brick-and-mortar establishments are unwilling to alter or replace traditional POS terminals with more capable units because doing so would be expensive, time-consuming, and may compromise the security of the cash exchanges at the establishments.

Due to the lack of appropriate communication protocols between POS terminals and CHDs, a user located at a POS terminal for a register till that includes the necessary cash for performing a physical cash payout may nevertheless be required to leave the POS terminal, travel to a CHD to obtain the necessary cash, and then return to the POS terminal to perform the cash payout. The automated systems of the present disclosure enable access to cash directly from the POS terminal (and/or a register till thereof) without negating the security and accountability benefits for which traditional POS terminals are designed. Moreover, the automated systems of the present disclosure are tailored to and work within the limited capabilities of legacy POS terminals (e.g., including the software/firmware functions that cause the POS terminals to operate a register till, such as to cause a cash drawer to open, dispense cash, etc.) to provide the benefits discussed herein without altering existing systems.

To do so, some of the embodiments of the present disclosure may receive payout data for a physical payout from a mobile device of a user. In the event that the payout data identifies a register till (e.g., at which the user is currently located), the automated system conducts a simulated interaction between the CHD and the register till. The simulated interaction includes a virtual pick-up transaction from the register till (simulating a movement of physical cash from the register till to the CHD) and a virtual payout transaction from the CHD (simulating a payout of physical cash from the CHD). Once simulated, the automated system may cause the register till to dispense and/or unlock access to the cash necessary to perform the physical cash payout. In this way, the specialized designs of computing devices in a cash-based environment may be accommodated, while allowing access to cash at various locations within an establishment. This ultimately results in improved accessibility to cash within an establishment, while also improving the tracking, monitoring, and security of cash handling operations within the establishment.

In addition, some embodiments of the present disclosure present automated systems that improve upon traditional techniques for authorizing, tracking, and recording physical cash payouts in a physical establishment. Due to the volatility and unpredictability of physical cash payouts, traditional techniques for monitoring cash payouts require recordation of the payouts after the cash is provided to a recipient. Moreover, traditional systems for managing cash payouts are unable to provide cash payout information to a centralized system (e.g., monitoring server) in real time and/or near real time as a cash payout is made. Traditionally, a CHD, one or more POS terminals, and/or other computing entities may be communicatively connected to a centralized system, but none of the networked devices/systems enable user to enter payout information in real time during and/or to authorize a cash payout. The time delay between the performance of a physical cash payout (e.g., when the cash is handed to a recipient) and the recordation of the payout may lead to accounting inaccuracies and prevent the verification of a payout before it is provided.

To overcome these technical shortcomings, the automated systems of the present disclosure provide real-time data collection and verification techniques for surfacing payout information for a payout to validate the payout before it is authorized and/or performed. The real-time data collection and/or verification techniques may leverage a mobile device that communicates with the centralized system and that enables a user to enter payout information in real time, as a cash payout is made. The real-time data collection and verification techniques leverage a plurality of mobile device user interfaces specially designed to extract user input providing information for validating a cash payout. The plurality of mobile user interfaces may be tailored to a particular use case and may form multiple different sequences of interface flows depending on the particulars of a cash payout. For instance, each user interface in a payout sequence may be automatically presented based at least in part on information in the preceding user interface. In this way, user interfaces may be automatically presented to validate payout information in real time as it is entered by a user. By way of example, in response to detecting a travel-related payout, a travel user interface that is tailored to a mileage-based expense may be automatically presented to validate a mileage expense for the travel-related payout based at least in part on the user's current location and/or location history. As another example, in response to detecting an expense that has associated documentation, such as a receipt, a receipt user interface may be automatically presented to validate the expense based at least in part on an image of the receipt. Thus, unlike traditional techniques, the real-time data collection and verification techniques of the present disclosure are configured to automatically display specific sequences of user interfaces to a user that are tailored to a particular payout use case. The improved user interfaces for electronic devices may be practically applied in a physical cash payout setting to improve the accountability, security, and accessibility to cash payouts over traditional cash flow monitoring systems. Ultimately, the automated systems of the present disclosure leverage new user interface designs and sequences to enable secure, real-time access to physical cash in a brick-and-mortar establishment, which is unattainable by traditional computing systems.

In addition to the shortcomings noted above, traditional cash monitoring and tracking systems may require users to continually monitor cash payouts during an operational time period and independently record the cash payouts at infrequent intervals. This leads to data inconsistencies and formatting incompatibilities between sets of data provided by different parties, which ultimately prevents the aggregation of data across multiple establishments for an organization. These technical deficiencies lead to problems with tracking cash payouts across multiple establishments, which prevents the efficient management of recurrent payouts and/or the identification of duplicative or redundant payouts. To address these deficiencies, the automated systems of the present disclosure present a network-based monitoring server for surfacing and aggregating payout data across a plurality of establishments for an organization. By leveraging the specialized user interfaces of the present disclosure, data may be surfaced from a plurality of users and stored, in a proper format, at a central repository where it can be combined and aggregated with holistic payout data from a plurality of physical cash payouts across an organization. Cash authorization instructions may be generated based at least in part on the formatted payout data and automatically provided to network-connected devices, such as CHDs and/or POS terminals, to allow a user to physical access cash in real time while preventing the misuse, theft, and/or other exploitations of cash payout processes.

Computer Program Products, Methods, and Computing Entities

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

The terms software, computer program product, and similar words may be used herein interchangeably.

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media/memory).

In one embodiment, a non-volatile computer-readable storage medium may include a floppy disk, flexible disk, hard disk, solid-state storage (SSS) (e.g., a solid state drive (SSD), solid state card (SSC), or solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-recordable (CD-R), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile e random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Exemplary System Architecture

FIG. 1 provides an illustration of an exemplary computing ecosystem 100 of the present disclosure. As shown in FIG. 1, this particular embodiment may include one or more monitoring servers 120, one or more mobile devices 110, one or more point of sale (POS) terminals 140 (e.g., respectively associated with one or more register tills, etc.), one or more CHDs as discussed herein, and one or more networks 280 enabling communication among the various entities of the computing ecosystem 100. Each of these components, entities, devices, systems, and similar terms used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

Monitoring Server

Figure 2:
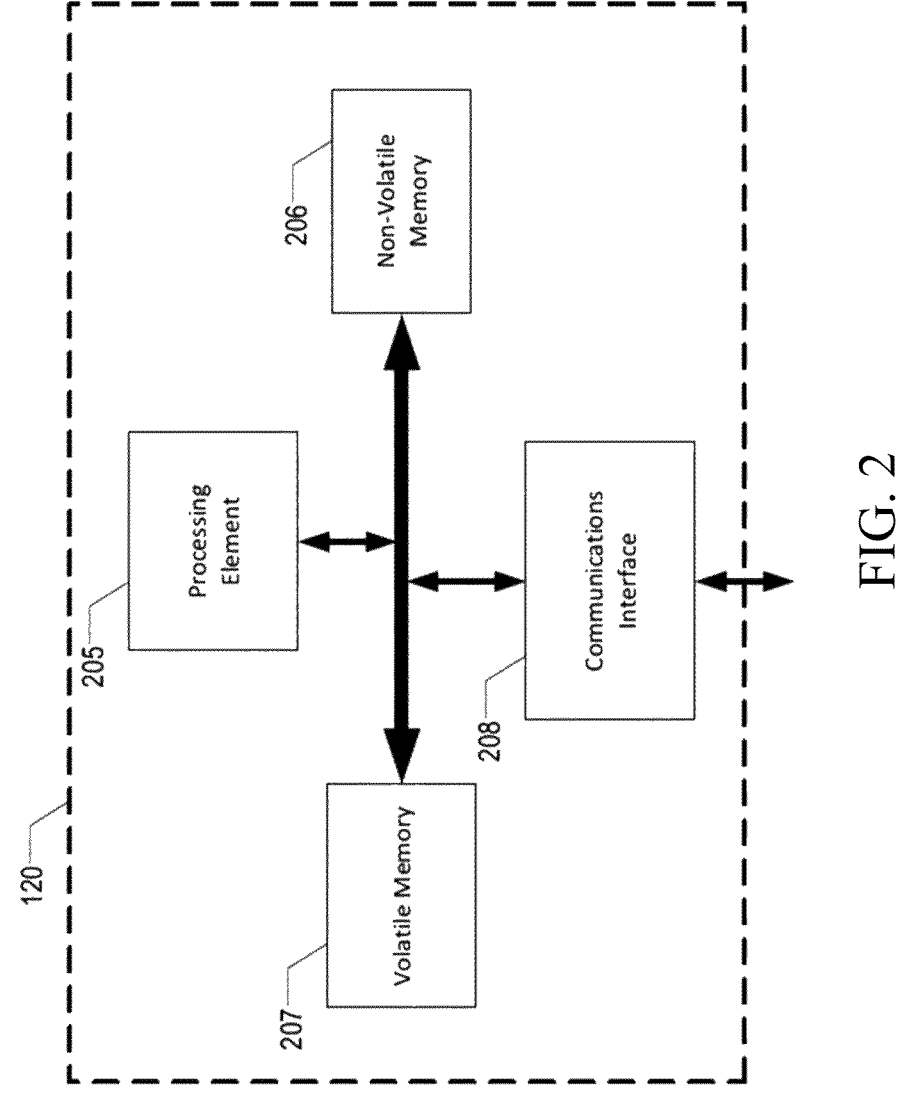
FIG. 2 schematically illustrates features of a monitoring server according to certain embodiments of the present disclosure.

FIG. 2 provides a schematic of a monitoring server 120 according to one embodiment of the present invention. In one embodiment, the monitoring server 120 may be in network communication with one or more CHDs 130 for simulating interactions occurring in association with those CHDs 130, one or more POS terminals 140, one or more register tills, one or more mobile devices 110, and/or the like to provide various data, instructions, and/or communications therebetween. In certain embodiments, the monitoring server 120 may be operable in association with other computing devices and/or platforms to accomplish certain functions (e.g., simulated interactions) for physical cash payouts, and/or the like. In general, the terms computing entity, computer, entity, device, system, server, machine, and/or similar words used herein interchangeably may refer to, for example, one or more computers, computing entities, desktop computers, mobile phones, tablets, phablets, notebooks, laptops, distributed systems, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, controlling, remotely controlling, dispensing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

In one embodiment, the monitoring server 120 may include or be in communication with one or more monitoring server data repositories and/or one or more processing elements 205 (also referred to as processors, processing circuitry, processing device, and/or similar terms used herein interchangeably) that communicate with other elements within the monitoring server 120 via a bus, for example. In certain embodiments, the monitoring server data repositories may maintain a wide variety of data accessible to the monitoring server 120, such as user-specific items (e.g., user (login) ID, password (or other authentication credential(s)), one or more account number(s), user name, user registration status, and/or the like). As will be understood, the processing element 205 may be embodied in a number of different ways. For example, the processing element 205 may be embodied as one or more complex programmable logic devices (CPLDs), "cloud" processors, microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media/memory or otherwise accessible to the processing element 205. As such, whether configured by hardware or computer program products, or by a combination thereof, the processing element 205 may be capable of performing steps or operations according to embodiments of the present invention when configured accordingly.

In one embodiment, the monitoring server 120 may further include or be in communication with non-volatile media/memory (also referred to as non-volatile storage, memory, memory storage, memory circuitry and/or similar terms used herein interchangeably). In one embodiment, the non-volatile storage or memory may include one or more non-volatile storage or memory media 206, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity-relationship model, object model, document model, semantic model, graph model, and/or the like.

In one embodiment, the monitoring server 120 may further include or be in communication with volatile media/ memory (also referred to as volatile storage, memory, memory storage, memory circuitry and/or similar terms used herein interchangeably). In one embodiment, the volatile storage or memory may also include one or more volatile storage or memory media 207, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the monitoring server 120 with the assistance of the processing element 205 and operating system.

As indicated, in one embodiment, the monitoring server 120 may also include one or more communications elements/interfaces 208 for communicating with various computing entities, such as by communicating data, content, information, and/or similar terms used herein interchangeably that can be transmitted, received, operated on, processed, displayed, stored, and/or the like. For instance, the monitoring server 120 may communicate with one or more mobile devices 110, one or more CHDs 130, one or more networks 280, one or more POS terminals 140, one or more register tills, and/or the like.

In certain embodiments, the monitoring server 120 may be configured to receive data from a plurality of data sources with respect to cash inventory stored at a particular CHD 130, a particular POS terminal 140, and/or the like. For example, the CHD 130 and/or POS terminal 140 may provide data indicative of aggregate inputs and outputs of cash to the machine, while a user computing device may provide data indicative of how the aggregate inputs and outputs are divided among a plurality of register tills (or retail, the terms being utilized herein interchangeably) (e.g., usable with respective POS terminals 140). Accordingly, the monitoring server 120 may be configured to provide till-level inventory tracking configurations based at least in part on the aggregate amount of cash input to or output from a particular CHD 130 and/or POS terminal 140, as well as manually generated data provided from a user computing entity indicative of how the cash was distributed from/to a various tills.

As indicated, in one embodiment, the monitoring server 120 may also include one or more communications interfaces 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the monitoring server 120 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The monitoring server 120 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Although not shown, the monitoring server 120 may include or be in communication with one or more input elements, such as a keyboard input, a mouse input, a touch screen/display input, motion input, movement input, audio input, pointing device input, joystick input, keypad input, and/or the like. In one embodiment, the monitoring server 120 may also include or be in communication with one or more output elements (not shown), such as audio output, video output, screen/display output, motion output, movement output, and/or the like.

As will be appreciated, one or more of the monitoring server's 120 components may be located remotely from other monitoring server 120 components, such as in a distributed system. Furthermore, one or more of the components may be combined and additional components performing functions described herein may be included in the monitoring server 120. Thus, the monitoring server 120 can be adapted to accommodate a variety of needs and circumstances. As will be recognized, these architectures and descriptions are provided for exemplary purposes only and are not limiting to the various embodiments.

Exemplary Mobile Device

In one embodiment, a user may be an individual, a representative of a customer, such as a company or organization, and/or the like who wants to deposit and/or withdraw cash from a CHD 130, for example, to perform a physical cash payout as described herein. The user may interact with a CHD 130 via a user interface thereon, and/or the user may interact with a mobile device 110 to obtain information/data regarding one or more accounts to which the user has access. As will be recognized, an account associated with a CHD 130 may be any of a number of different account types, including a bank-owned cash account, a non-bank owned cash account, and/or the like. Accounts may be associated and/or linked with any of a variety of banking institutions holding accounts on behalf of a customer. Moreover, an account could be associated with more than one user (e.g., a plurality of employees associated with a customer holding an account), and each user may have different account access credentials (e.g., a first user may have withdrawal and deposit access and a second user may have deposit only access to an account). Moreover, each user may have access to an account via different access identifiers (e.g., different user identifiers), or in certain embodiments each user may have access to the account via an identical access number. In other embodiments, a single user identifier may be associated with more than one account (e.g., accounts associated with a plurality of departments within a commercial customer).

Figure 3:
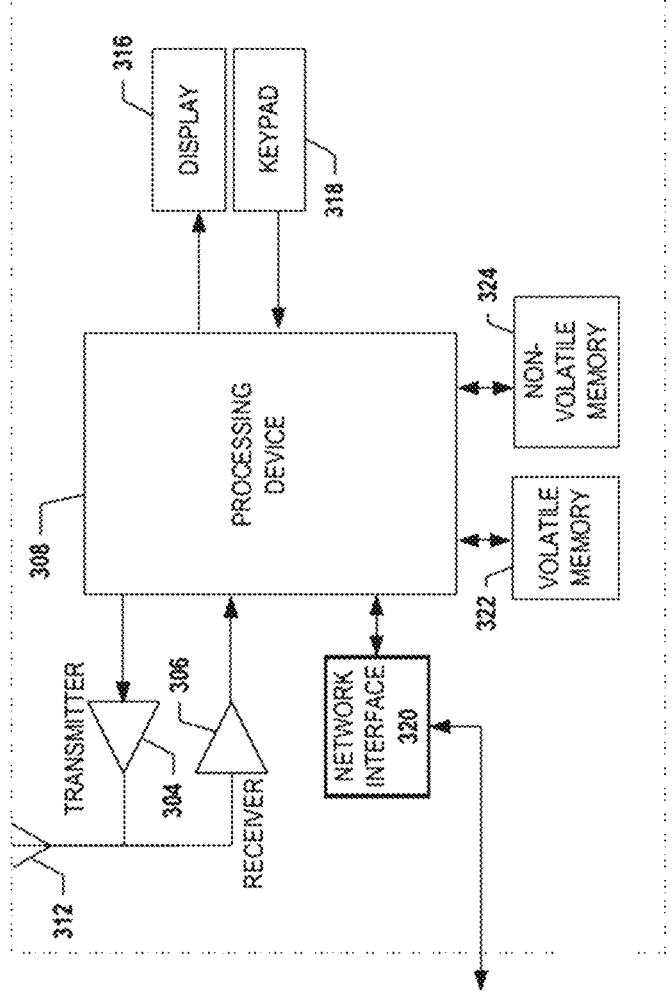
FIG. 3 schematically illustrates features of a mobile device according to certain embodiments of the present disclosure.
Figure 3:

The mobile device 110 includes one or more components that are functionally similar to those of the monitoring server 120. FIG. 3 provides an illustrative schematic representative of a mobile device 110 that can be used in conjunction with embodiments of the present invention. As noted previously, the terms device, system, computing entity, entity, server, and/or similar words used herein interchangeably may refer to at least, for example, one or more computers, computing entities, mobile phones, tablets, phablets, watches, glasses, earpieces, wristbands, wearable items/devices, the like, and/or or any combination of devices or entities adapted to perform the functions, operations, and/or processes described herein. As shown in FIG. 3, the mobile device 110 can include an antenna 312, a transmitter 304 (e.g., radio), a receiver 306 (e.g., radio), and a processing element 308 (e.g., CPLDs, microprocessors, multi-core processors, cloud processors, coprocessing entities, ASIPs, microcontrollers, and/or controllers) that provides signals to and receives signals from the transmitter 304 and receiver 306, respectively.

In one embodiment, the signals provided to and received from the transmitter 304 and the receiver 306, respectively, may include signaling information/data in accordance with air interface standards of applicable wireless systems. In this regard, the mobile device 110 may be capable of operating with one or more air interface standards, communication protocols, modulation types, and access types. More particularly, the mobile device 110 may operate in accordance with any of a number of wireless communication standards and protocols, such as those described above with regard to the monitoring server 120. In a particular embodiment, the mobile device 110 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the mobile device 110 may operate in accordance with multiple wired communication standards and protocols, such as those described above with regard to the monitoring server 120 via a network interface 320.

Via these communication standards and protocols, the mobile device 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). In one embodiment, the mobile device 110 can also download changes, add-ons, and updates, for instance, to its firmware, software (e.g., including executable instructions, applications, program modules), and operating system.

According to one embodiment, the mobile device 110 may include location determining aspects, devices, modules, functionalities, and/or similar words used herein interchangeably. For example, the mobile device 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). In one embodiment, the satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the mobile device's 110 position in connection with a variety of other systems, including cellular towers, Wi-Fi access points, and/or the like. Similarly, the mobile device 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, Bluetooth Smart, Wi-Fi Direct transmitters, NFC transmitters, and/or the like. These indoor positioning aspects can be used in a variety of settings to determine the location of someone or something to within inches or centimeters.

In one embodiment, the mobile device 110 may also comprise a user interface (that can include a display 316 coupled to a processing element 308) and/or a user input interface (coupled to a processing element 308). For example, the user interface may be a user application, browser, user interface, interface, and/or similar words used herein interchangeably executing on and/or accessible via the mobile device 110 to interact with and/or cause display of information/data from the monitoring server 120, as described herein. The user input interface can comprise any of a number of devices or interfaces allowing the mobile device 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the mobile device 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

In certain embodiments, the user interface (e.g., the display 316) may be configured for displaying access credentials that may be presented to a CHD 130 and/or POS terminals 140 to enable the user to gain account access via the CHD 130 and/or POS terminal. For example, the user interface of the mobile device 110 may be utilized to display a QR code, a bar code, an image, and/or the like that is machine-readable and indicative of the user's access credentials. Similarly, the mobile device 110 may be configured for storing access credentials thereon, and transmitting those access credentials via any of a variety of wireless data transmission protocols (e.g., Bluetooth, Wi-Fi, NFC, and/or the like) to the CHD 130 and/or POS terminals 140 to provide access credentials for the user to the CHD 130 and/or POS terminals.

The mobile device 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the mobile device 110. As indicated, this may include a user application that is resident on the entity or accessible through a browser or other user interface for communicating with the monitoring server 120 and/or various other computing entities.

As will be recognized, the mobile device 110 may include one or more components or functionality that are the same or similar to those of the monitoring server 120, as described in greater detail above. As will be recognized, these architectures and descriptions are provided for exemplary purposes only and are not limiting to the various embodiments. CHD Hardware An example CHD 130 is shown schematically at FIG. 4. As shown therein, components of the CHD 130 are disposed within and/or on a housing. The CHD 130 may comprise a user interface (e.g., an LCD monitor, a PIN-pad, and/or the like), one or more data readers (e.g., a card reader, a barcode reader, an NFC reader, a camera (which may also be utilized for recording security footage), a biometric reader, and/or the like). In certain embodiments, the CHD 130 hardware may comprise one or more secure information storage areas configured to securely store user data (e.g., user identifiers, user passwords/passcodes, user biometric data, and/or the like) to prevent unauthorized access to such user data. These secure information storage areas may be accessible to certain authorized users, thereby enabling those authorized users to add or remove user data, for example, as new employees/users become authorized to interact with the CHD 130 and/or as prior employees/users are no longer authorized to interact with the CHD 130.

The CHD 130 may further comprise one or more currency outputs (e.g., a coin dispenser, such as a rolled coin dispenser or a loose coin dispenser, a note dispenser, such as a loose note dispenser or a bound-note dispenser, and/or the like), one or more currency and/or negotiable instrument inputs (e.g., a coin recycler, a check/note scanner/recycler, a deposit cassette, and/or the like), a receipt printer, and/or the like. As discussed herein, the CHD 130 may additionally comprise a register till receiving portion configured to receive a register till during receipt and/or distribution of cash stored within the register till. In certain embodiments, the register till receiving portion may further comprise a register till identifier scanner configured to obtain register till identifier data for tills located therein, such that data indicative of cash added to and/or removed from the register till may be associated with the register till identifier.

The CHD 130 components collectively enable a user (e.g., a representative of a particular commercial establishment customer having an account accessible via the CHD 130) to deposit and/or withdraw funds from the CHD 130 (which may result in corresponding changes to an account balance in an account held at a particular banking institution for the commercial establishment), for example, when emptying or filling a register till. In certain embodiments, the CHD 130 may enable users to withdraw currency in requested quantities and denominations (e.g., requested quantities of each of a plurality of denominations). Users may interact with the CHD 130 via the one or more user interface mechanisms to (1) provide user identifying data (e.g., via the one or more data readers, the PIN pad, a touch screen, and/or the like), and (2) to provide data indicative of a requested transaction to be performed with the CHD 130.

In certain embodiments, a plurality of users may be associated with a single account with the CHD 130, and each of those users may be associated with differing account access levels. For example, a first user may have deposit and withdrawal access for a particular account, while a second user may only have deposit access for the particular account. Data indicative of the access credentials for each user may be stored locally in a non-transitory memory of the CHD 130, on a memory within a physical identification token (e.g., a card) carried by the user, and/or the like.

Figure 4:
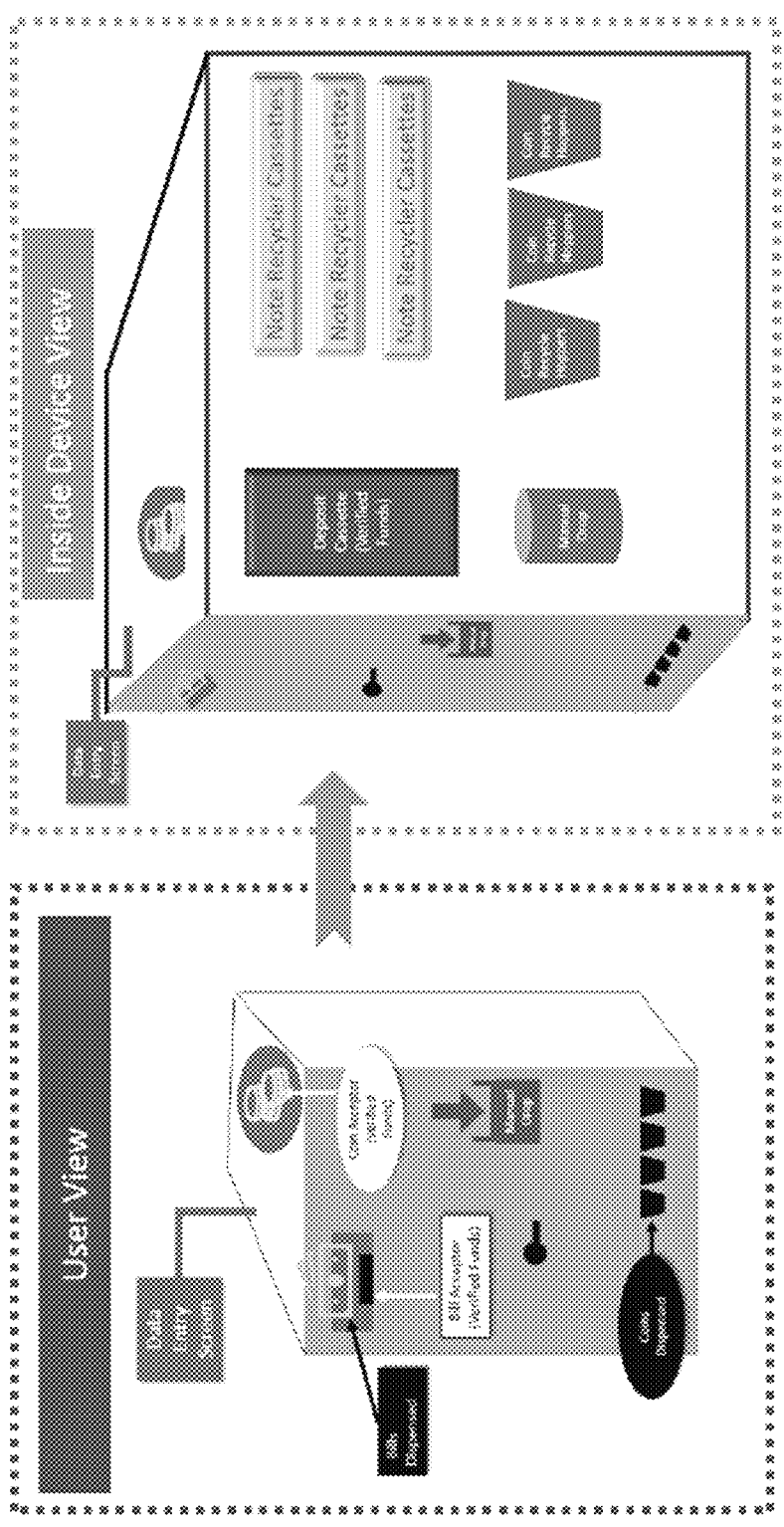
FIG. 4 schematically illustrates features of a CHD according to certain embodiments of the present disclosure.

With reference to FIG. 4, which illustrates a schematic view of various components of a CHD 130 according to one embodiment, the CHD 130 may comprise one or more components of a note (e.g., bank note) circulation system and one or more components of a coin circulation system.

In the illustrated embodiment, the note circulation system encompasses a note acceptor configured for providing notes to a user and/or for accepting notes deposited by a user. The note acceptor may be configured for processing a plurality of notes simultaneously (e.g., presented to the note acceptor in a stack) to speed transactions with the user. Notes passed between the note acceptor and one or more note recycler cassettes and/or deposit cassettes (illustrated in FIG. 4) are counted, imaged, and/or otherwise verified to monitor the quantity of notes deposited/withdrawn, as well as the denomination of those notes. Through the verification mechanism of the note acceptor, the note circulation system may be configured to separate out negotiable instruments (e.g., checks) and/or certain notes for direction to separate storage locations, and/or to separate out and return unreadable notes and/or unreadable negotiable instruments to a user. In certain embodiments, those unreadable notes and/or unreadable negotiable instruments may be resubmitted by the user via a manual drop system, and the user may manually provide information regarding the denomination of the particular notes provided to the CHD 130 via the manual drop.

As is particularly relevant for deposits, the note acceptor may be configured to segregate notes by denomination prior to providing those notes to a note recycler and/or deposit cassette. The segregated notes may be stored in separate storage locations (e.g., separated portions of a recycler cassette and/or separated portions of a deposit cassette) such that the notes may be easily recycled based at least in part on denomination for later transactions if needed. In certain embodiments, the separate storage locations may comprise separate deposit cassettes, separate recycler cassettes, and/or separated portions of a deposit cassette and/or recycler cassette.

A recycler cassette may include one or more storage mechanisms and one or more mechanical and/or logical control components for physically moving notes to and/or from the one or more storage mechanisms. A storage mechanism, for example, may include a movable and/or immovable physical container. The control components may include one or more mechanical mechanisms for moving the container (e.g., if movable) or moving notes within the container. The mechanical mechanisms may include one or more actuators, conveyors, pumps, lifts, and/or the like, that may be driven by one or more mechanical motors and/or other components for moving a container and/or notes within a container. In some examples, the mechanical mechanisms may be integrated with logical components, such as software, firmware, and/or the like that may be configured to control the operation of the mechanical mechanisms. For instance, the mechanical mechanisms may be controlled to move notes from a storage mechanism of the recycler cassette to another cassette (e.g., a deposit cassette, etc.), to a dispenser, and/or the like. By way of example, the control components may be configured to identify one or more notes, from a particular recycler cassette, pick-up the one or more notes (e.g., by applying a force through suction, grabbing, pushing, pulling, etc.), and/or mechanically convey the identified notes along a conveyance path to the dispenser (different cassettes may have different conveyance paths, but they may overlap proximate to the dispenser).

As a specific example utilized with U.S. currency, a CHD 130 may comprise two cassettes (deposit cassettes, recycler cassettes, or both) configured for receiving and/or dispensing $1 bills, a third cassette (deposit, recycler, or both) configured for receiving and/or dispensing $5 bills, a fourth cassette (deposit, recycler, or both) configured for receiving and/or dispensing $20 bills, a fifth cassette (deposit, recycler, or both) divided into separate sections, a first section for receiving and/or dispensing $5 bills and a second section for receiving and/or dispensing $10 bills. A sixth cassette (deposit only) may be configured for receiving overflow of any denomination of note (including $1, $2, $5, $10, $20, $50, and $100) when a respective denomination-specific cassette is full and/or if no denomination specific cassette is provided for a particular note. For clarity, a CHD 130 may comprise deposit only cassettes having the above-referenced configuration, recycler only cassettes having the above-referenced configuration (except for the deposit-only overflow cassette) or may have two sets of cassettes having the above-referenced configuration (e.g., a first set of deposit cassettes having the above-referenced configuration and a second set of recycler cassettes having the above-referenced configuration, but without the overflow cassette). It should be understood that the configuration of specific denomination-specific cassettes mentioned above is presented as an example only, and any combination of denomination-specific cassettes may be utilized.

In certain embodiments, each time notes are moved within the CHD 130, the notes may pass through a quantity and/or denomination verification system to automatically monitor the amount of currency moving between the various portions of the CHD 130, thereby enabling the CHD 130 to maintain an accurate count of the amount of currency in each denomination contained therein.

With reference now to the coin circulation system, the CHD 130 may comprise a coin acceptor configured to accept coins deposited by a user of the CHD 130 (e.g., accepting rolled coins and/or loose coins). The coin acceptor may have a rejection tray configured to return any unrecognizable coins deposited by the user. Moreover, the coin acceptor comprises a counting and/or verification system configured for counting the quantity and denomination of coins provided via the coin acceptor. Coins may then be passed to one or more coin recycle hoppers (e.g., which may comprise open trays, roll-creating hoppers, and/or the like) for storage within the CHD 130. In certain embodiments, those coin recycle hoppers may be configured for selectably dispensing coins as needed to fulfill a withdrawal request (e.g., as loose coins or as rolled coins). In such embodiments, the coins may be passed to one or more coin dispensing trays (e.g., coin roll dispensing trays or loose coin dispensing trays) for presentation to the user.

Like the note recyclers mentioned above, the CHD 130 may comprise a plurality of denomination specific coin hoppers for storage of deposited coins. For example, a CHD 130 may comprise two coin hoppers configured for storing $0.01 coins therein, another two coin hoppers configured for storing $0.05 coins therein, a fifth coin hopper configured for storing $0.10 coins therein, sixth and seventh coin hoppers configured for storing $0.25 coins therein, and an eighth, overflow coin hopper configured for storing coins of any denomination (such as $0.01, $0.05, $0.10, $0.25, $0.50, and $1). A CHD 130 may comprise deposit only coin hoppers having the above configuration, recycler coin hoppers having the above configuration, or both recycler coin hoppers and deposit coin hoppers having the above configuration. Moreover, the configuration of denominations of coin hoppers discussed herein is provided merely as an example, any combination of denomination-specific coin hoppers may be utilized.

Moreover, the CHD 130 may comprise a manual drop circulation system comprising a manual drop acceptor configured to accept notes and/or negotiable instruments provided by the user, and a manual drop storage cassette. The manual drop acceptor may operate in conjunction with the user interface, such that the manual drop may associate user-provided information regarding the quantity of a particular manual drop (e.g., value, quantity of a particular currency, and/or the like) with notes accepted via the manual drop. In certain embodiments, the manual drop cassette may be configured to separate each collection of notes accepted via the manual drop, such that the user-provided information regarding the quantity of currency provided via the manual drop may remain reflective of an amount of currency stored within a particular separated collection of notes. The manual drop may be a deposit only system, such that notes are not recycled to users from the manual drop cassette.

Although not shown, the CHD 130 may be configured for automatically providing cash into a cashier tray (also referred to herein as a register till) (e.g., a tray to be utilized with a cash register at a POS terminal 140). In such embodiments, the cashier tray may be supported within the CHD 130, and the CHD 130 may selectably deposit quantities of notes and coins of select denominations into segmented portions of the cashier tray. As described herein, these physical interactions in which the CHD 130 physically dispenses quantities of notes and coins of select denominations into segmented portions of the cashier tray may be simulated to improve operational efficiency throughout a facility.

Moreover, the CHD 130 comprises a receipt printer configured for printing physical receipts that may be usable by individual users and/or during change order processing as discussed herein.

The CHD 130 may be configured such that at least a portion of the cash contained therein is bank-owned. This bank-owned cash is not associated with any one or more customers' account(s), thereby enabling credits to be given to a user's account upon receiving a physical cash deposit at the CHD 130. Similarly, credit is not deducted from the user's account until and unless the user withdraws physical cash from the bank owned cash portion of the CHD 130.

In certain embodiments, the CHD 130 is configured such that only a portion of the total cash contained within the CHD 130 is bank-owned, and accordingly the CHD 130 defines a plurality of cash storage locations therein, including at least one storage location for bank owned cash and another storage location for customer (depositor) owned cash. As just one example, bank owned cash may be stored within a deposit cassette (which may not define an outlet for cash), while cash within a note recycler and/or a coin recycler (having both deposit and withdrawal configurations) may remain depositor owned. In certain embodiments, the CHD 130 comprises a verification mechanism for counting the quantity and value of notes being transferred into the deposit cassette or other storage location associated with bank-owned-cash. Accordingly, the CHD 130 is configured to utilize only verified funds that have been specifically counted and valued via the verification mechanism for bank-owned-cash.

In certain embodiments, the CHD 130 may be configured to enable deposits and withdrawals from bank owned cash portions by various users. Accordingly the bank owned cash portion of the CHD 130 may encompass at least a note recycler (and/or a coin recycler), and may additionally comprise a deposit cassette in certain embodiments.

CHD Controller

A CHD having the physical configuration discussed herein may have one or more onboard computing controllers configured for performing various functions and/or for controlling the functionality of various components of the CHD. In one embodiment, the CHD controller is embodied as a computing entity that may have a configuration similar to the mobile device 110 discussed above, and which may be configured to support processing in connection with deposit and withdrawal transactions for funds via the CHD. For example, the CHD controller may be electrically (e.g., through one or more conductive wires, cables, etc.) and/or wirelessly (e.g., through one or more transmitters, receivers, etc. configured for one or more radio wave, microwave, and/or the like frequencies) connected to the control components of one or more cassettes of the CHD. In some examples, the CHD controller may provide one or more instructions, via the connection, to the control components of the one or more cassettes to cause the movement of cash within the CHD. In this manner, the CHD controller may cause one or more control components of the one or more cassettes to dispense cash, for example, to execute a physical cash payout.

The one or more CHD controllers may include computing device(s) that are local to a corresponding CHD and/or computing device(s) that are remotely located. At least one of the CHD controllers may be configured to access and store information/data in at least one of one or more datastores to perform processing supported by the CHD.

As just one example, the CHD controller may be configured to monitor the amount of each of a plurality of denominations of cash that are dispensed and/or collected during a deposit or withdrawal transaction. When dispensing cash into a register till, the CHD controller may store a till identifier for which dispensing is performed, and may store data indicative of the amount of cash (and the denominations of those distributions) dispensed into the register till. Additional metadata associated with the transaction may also be stored, such as the date and/or time of dispensing, a user identifier associated with the transaction, and/or the like. The CHD controller may provide the stored data of the transaction to the monitoring server (e.g., by transmitting the transaction-specific data via a network) for further processing. Similarly, when receiving cash deposited from a register till, the CHD controller may store a till identifier for which dispensing is performed, and may store data indicative of the amount of cash (and the denominations of those deposits) deposited from the register till. Additional metadata associated with the transaction may also be stored, such as the date and/or time of dispensing, a user identifier associated with the transaction, and/or the like. The CHD controller may provide the stored data of the transaction to the monitoring server (e.g., by transmitting the transaction-specific data via a network) for further processing.

Exemplary POS Terminal

A POS terminal 140 may be configured for receiving and/or dispensing cash during one or more transactions. A POS terminal 140 may be embodied as a self-checkout (SCO) terminal, specifically configured for operation with/by a retail customer. Particularly for POS terminals 140 configured for use in SCO implementations, the POS terminal 140 limits user access to cash stored therein, by accepting cash via a cash acceptor mechanism (e.g., an acceptor slot) and dispensing cash via a cash dispensing mechanism (e.g., a dispensing slot).

In other embodiments, a POS terminal 140 may be specifically configured for operation with/by a retail employee helping retail customers during transactions. The POS terminal 140 may comprise one or more user interface devices (e.g., an LCD monitor, a PIN-pad, and/or the like), one or more data readers (e.g., a card reader, a barcode reader, an NFC reader, a camera (which may also be utilized for recording security footage), a biometric reader, and/or the like). In certain embodiments, the CHD 130 hardware may comprise one or more secure information storage areas configured to securely store data, such as transaction data, cash content data, and/or the like.

The POS terminal 140 may further comprise one or more currency outputs (e.g., a coin dispenser, such as a loose coin dispenser, a note dispenser, such as loose note dispenser, and/or the like), one or more currency intakes (e.g., a coin acceptor, a check/note scanner/acceptor, and/or the like), a receipt printer, and/or the like. The POS terminal 140 may additionally comprise one or more cash recycler portions configured to store cash, separated by denomination, therein.

The cash recycler portions may be configured to accept cash provided to the POS terminal 140 and/or to dispense cash from the POS terminal 140, for example, as change to a customer during a transaction. As discussed herein, the cash recycler portion may be configured as a Last-In-First-Out configuration for each denomination, such that the most recently received bill for a particular denomination is the first bill to be dispensed during the same or a later transaction.

The POS terminal 140 may comprise a note circulation system encompassing a note acceptor configured for providing notes to a user and/or for accepting notes deposited by a user. The note acceptor may be configured for processing a plurality of notes simultaneously (e.g., presented to the note acceptor in a stack) to speed transactions with the user. Notes passed between the note acceptor and one or more note recyclers may be counted, imaged, and/or otherwise verified to monitor the quantity of notes provided/withdrawn from the POS terminal 140, as well as the denomination of those notes.

As is particularly relevant for deposits, the note acceptor may be configured to segregate notes by denomination prior to providing those notes to a note recycler. The segregated notes may be stored in separate storage locations (e.g., separated portions of a recycler) such that the notes may be easily recycled based at least in part on denomination for later transactions if needed.

Moreover, the POS terminal 140 may comprise a POS terminal controller configured for causing the POS terminal 140 cash recycler to deposit and/or accept cash in applicable amounts for a particular transaction. In certain embodiments, the POS terminal controller may have a configuration similar to the CHD controller, such that the POS terminal controller comprises one or more non-transitory memory storage areas, one or more processors, one or more network connection mechanisms, and/or the like. Accordingly, the POS terminal controller may be in electronic communication (e.g., via a network) with the CHD controller, the monitoring server, and/or the like. Such network connections thereby enable the monitoring server to provide data directly to a POS terminal 140 (and vice versa), for example, so as to update data representative of an amount of BOC contained within the POS terminal 140, and/or to update data enabling the POS terminal 140 to distribute BOC during transactions.

Exemplary Networks

In one embodiment, any two or more of the illustrative components of the architecture of FIG. 1 may be configured to communicate with one another via respective communicative couplings to one or more networks 280. The networks 280 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 280 may have any suitable communication range associated therewith and may include, for example, global networks (e.g., the Internet), metropolitan area networks (MANs), wide area networks (WANs), local area networks (LANs), or personal area networks. In addition, the networks 280 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Transmissions over networks 280 may be "in the clear" or may leverage one or more of a variety of industry-standard or third-party security technologies implemented in any of the OSI layers used. If encryption is used, it may be symmetric or asymmetric (or implement a combination of the two, as in SSL/TLS, where the initial handshake uses asymmetric encryption in the exchange of symmetric keys, and subsequent transactions use symmetric encryption based at least in part on the previously exchanged symmetric keys). As will be recognized, process interaction over a network may be synchronous or asynchronous: synchronous-processes are coupled and include web services (e.g., SOAP), which may in turn leverage http(s); and various other remote procedure call (RPC), middleware protocols, industry-standard exchange formats (e.g., XML or JSON), and integration architectures (e.g., REST) and/or asynchronous-processes are decoupled and mechanisms include message queues and file transfers.

Exemplary System Operation

As discussed herein, various embodiments are directed to systems and methods for simulating interactions between a plurality of networked devices, such as one or more CHDs 130, mobile devices 110, and/or POS terminals 140 to facilitate physical cash payouts across various locations of an establishment.

As indicated above, the monitoring servers 120 are configured for generating and/or maintaining one or more cash utilization models based at least in part on cash dispensing and receiving data generated at one or more CHDs. Thus, the monitoring server 120 periodically and/or continuously receives cash usage data (e.g., in the form of transaction-specific data associated with deposit, withdrawal, pay out, and/or the like transactions) from one or more CHDs, assigns appropriate account, and/or entity identifier data with the received cash usage data (such that cash usage data is utilized as input for appropriate models), and stores the cash usage data in one or more databases for usage in generating and/or maintaining cash utilization models. Such data may be utilized to facilitate and account for physical transactions, including physical cash payouts, at brick and mortar establishments.

As discussed herein, the monitoring server 120 may be configured to communicate with one or more CHDs utilizing one or more communication protocols. Moreover, data received from the one or more CHDs may be encrypted utilizing one or more encryption protocols, and accordingly the monitoring server 120 may be configured to appropriately decrypt data received from the CHDs. As discussed herein, the monitoring server 120 may be configured to communicate with one or more mobile devices 110, CHDs 130, and/or POS terminals 140 utilizing one or more communication protocols. Moreover, data received from the one or more mobile devices 110, CHDs 130, and/or POS terminals 140 may be encrypted utilizing one or more encryption protocols, and accordingly the monitoring server 120 may be configured to appropriately decrypt data received from the CHDs 130 and/or POS terminals 140.

Figure 5:
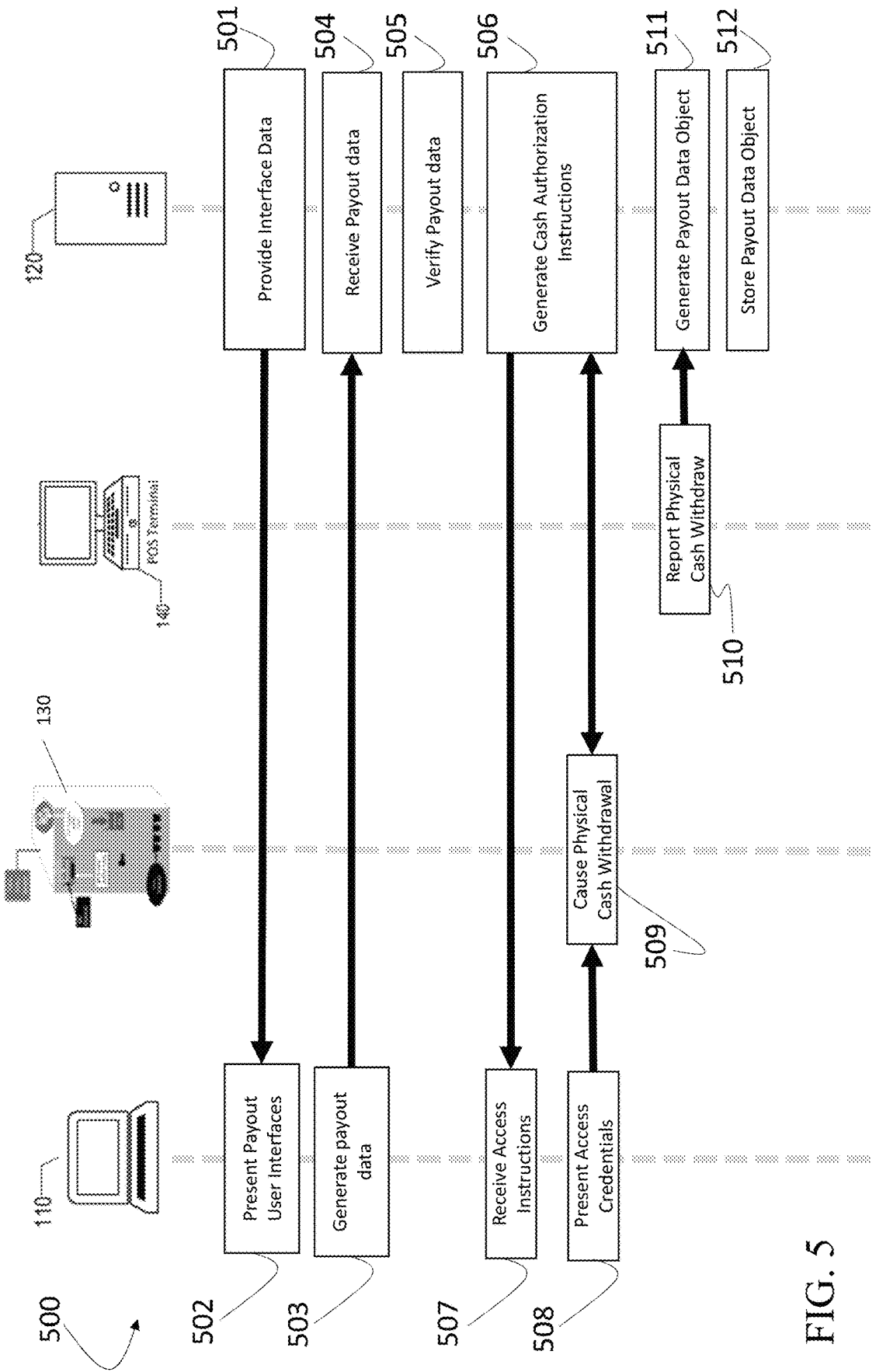
FIGS. 5-6 are flowcharts illustrating various actions performed by computing entities of certain embodiments of the present disclosure.
Figure 6:
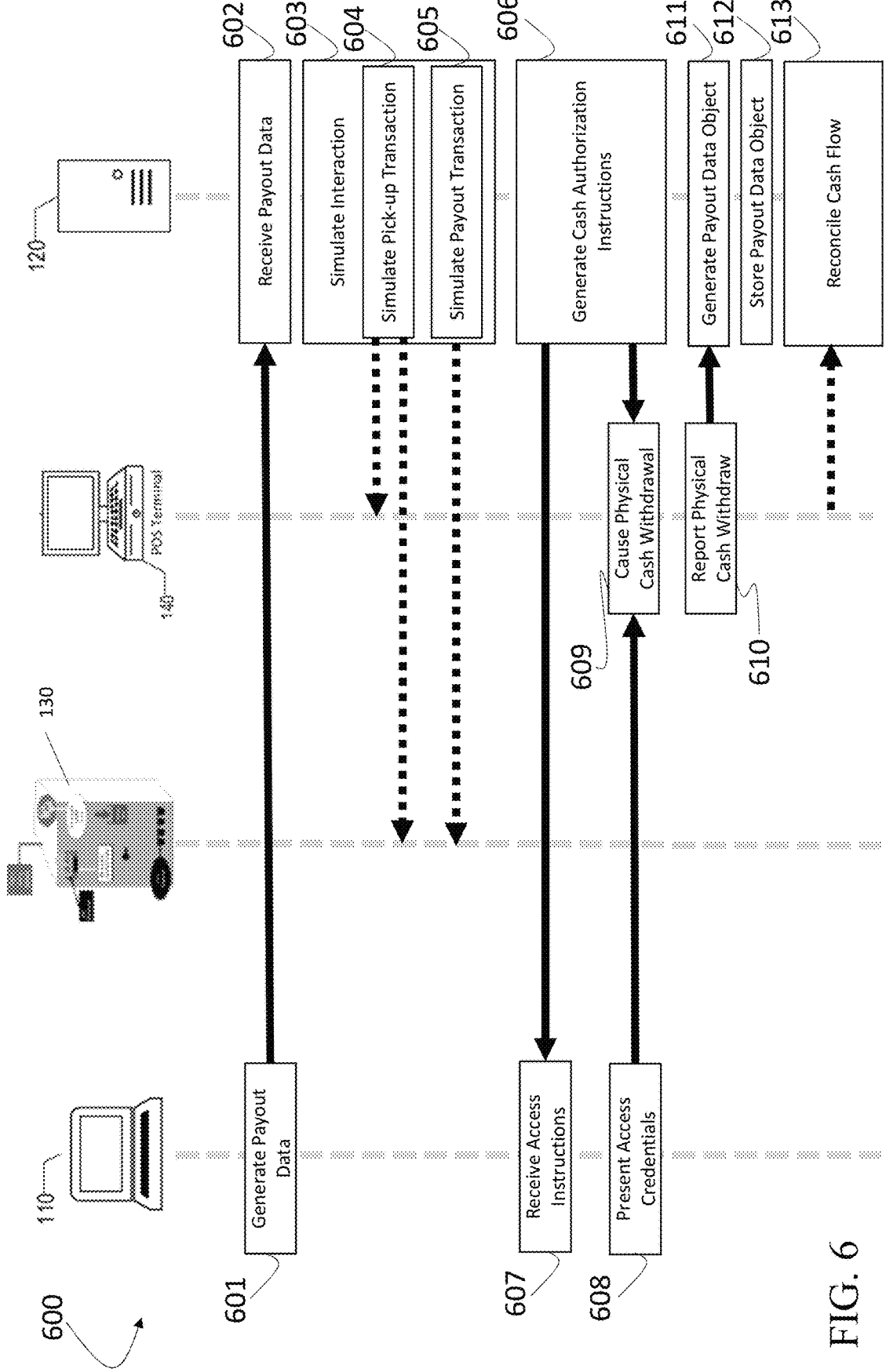

FIG. 5 illustrates various steps performed by computing entities and/or hardware entities in accordance with various embodiments.

Remote Operation of Physical Cash Payout

As described herein, physical cash payouts may be beneficial at brick and mortar establishments to handle situations, such as payroll advances, employee events, overtime compensation, and/or the like, in which petty cash is required. Traditionally, these physical cash payouts require hard cash withdrawals from a CHD 130 that is, by design, not easily accessible within the brick and mortar establishment. To handle physical cash payouts, employees must be physically located at a CHD 130 to initiate a hard cash withdrawal. The physical cash payout is initiated in the same manner as withdrawals for any other situation with the exception that the employee is expected to self-record the transaction to account for a negative balance. This can be time-consuming and may lead to incomplete or inaccurate payout records. To address gaps between store reconciliation and accountability with POS terminals 140 that may be the product of physical cash payouts, the present disclosure describes cash payout flows that initiates a physical cash payout through specialized user interfaces presented by a mobile device 110.

In some embodiments of the present disclosure, a monitoring server 120 may provide data indicative of a plurality of payout user interfaces to a mobile device 110 to cause the mobile device 110 to display one or more of the plurality of payout user interfaces, as reflected at Block 501 of FIG. 5. It should be understood that the payout user interfaces (and the data indicative thereof) may be stored locally at the mobile device 110 (e.g., as a part of an executable software application stored and executed by the mobile device 110). In the latter embodiments, the mobile device 110 may be configured to provide user input data (or other data generated at the mobile device 110) to the monitoring server 120 without need for the monitoring server 120 to transmit data indicative of the payout user interfaces during use of the software application. The plurality of payout user interfaces may be based at least in part on payout criteria for an organization and/or an establishment thereof. For example, each of the payout user interfaces may correspond to one or more payout criteria for validating a physical cash payout in accordance with one or more procedures, policies, and/or the like, of an organization. The payout criteria may be specific to the organization (e.g., and/or an establishment thereof) and/or one or more policies, procedures, and/or the like thereof. As some examples, the payout criteria may include a payout value, a payor (e.g., the user initiating the physical cash payout), a payee (e.g., a vendor or other entity that receives the cash payment), a reason, type, time, location (e.g., for travel related payouts, etc.), and/or any other information that may be related to a physical cash payout. As described herein, the payout criteria may establish informational guidelines for obtaining information for a cash payout to improve accountability across an organization and/or brick-and-mortar establishments thereof, while enabling physical cash payouts when appropriate.

In some embodiments, each of the plurality of user interfaces may be specifically tailored to one or more of the payout criteria. By way of example, the user interfaces may include a landing page for selecting a type of payout, an expense page for selecting expenses covered by the physical cash payout, a receipt page for inputting images (e.g., or other type of representation) for an expense, a travel page for entering and/or calculating mileage for travel-related expense, a vendor page for providing information for a payee in a vendor related payout, and/or the like. In some examples, the payout criteria may require user signatures to verify a physical cash payout. In such a case, the plurality of user interfaces may include at least one verification user interface. The verification user interface may display a summary of a physical cash payout, a payor signature block, and/or a payee signature block. A user (e.g., a payor) and/or a recipient (e.g., a payee, etc.) may interact with the verification user interface to provide verification data that may be recorded as a portion of payout data. The verification payout user interface, as well as other payout user interfaces, are described in more detail with reference to FIGS. 7-13.

The monitoring server 120 may cause, via the mobile device 110, a presentation of the plurality of user interfaces to a user of the mobile device 110. For example, as reflected at Block 502, the mobile device 110 may be configured to present one or more of the payout user interfaces to the user. In some embodiments, the mobile device 110 may be configured to present a particular sequence of the user interfaces to guide the user through a cash payout flow designed to ensure that all required information (e.g., per the payout criteria of the organization and/or establishment thereof) is captured in the proper format with the least amount of data entry possible. For example, the user may interact with one or more of the payout user interfaces to provide user input for a physical cash payout. In some examples, the payout user interfaces may be designed to reduce data entry for the user by providing standardized drop downs, selectable widgets, and/or the like, rather than relying on text boxes that require the user to type information.

As described herein, the plurality of user interfaces provide a non-traditional arrangement of icons and sequences of user interface screens that improve the accessibility of accurately formatted information for a user. Typically, information for a payout flow is manually recorded and then submitted through text reproductions of the user's recollection of the event. This leads to inaccurate, incomplete, and, at times, uninterpretable information regarding physical cash payouts from an establishment. The specific user interfaces, and interfaces sequences, of the present disclosure provide a technical improvement over traditional data entry systems that, when applied to a cash payout flow, improves data entry, formatting, and data interpretability in a highly regulated business domain. By constraining user input with specially designed user interfaces tailored to payout criteria specific to an organization, embodiments of the present disclosure allow for better accountability, tracking, and monitoring of physical cash payout that are necessary during the course of business. This, in turn, improves accessibility to physical cash payouts at brick and mortar locations, while preventing the misuse or exploitation of such necessary business tasks.

As reflected by Block 503, the mobile device 110 may generate payout data for the physical cash payout. The payout data may be based at least in part on user input provided through the plurality of user interfaces. For example, the payout data may include (i) payor data indicative of a payor (e.g., the user initiating the physical cash payout), one or more attributes of a payor, and/or the like, (ii) payee data indicative of a payee (e.g., a vendor or other entity that receives the cash payment), one or more attributes of a payee, and/or the like, (iii) justification data indicative of a reason for the physical cash payout and/or one or more expenses thereof, (iv) categorical data indicative of a type of payout (e.g., from an approved list of payout types, etc.), (v) expense data indicative of one or more expenses covered by the payout, one or more expense attributes, and/or the like, (vi) value data indicative of a payout value, one or more expense values, and/or the like, (v) temporal data indicative of a time of the request for the payout, and/or the like, (vi) location data indicative of one or more locations for travel-related expenses, and/or the like, and/or any other information that may be related to a physical cash payout. It is noted that, while the present disclosure describes some examples of payout data, the payout data may vary depending on an organization, establishment, and/or payout criteria and is not limited to examples provided herein. As used herein, the payout data includes any information that may be applicable to any payout flow or any other exchange (e.g., withdrawal, deposit, etc.) of physical cash.

In some embodiments, the payout data may identify a payor of the physical cash payout. The payor may include a user associated with the physical cash payout. For example, the user may include the user of the mobile device 110. In some examples, the user may provide user credentials (e.g., via a user interface of the mobile device) to request a physical cash payout. By way of example, the user may log into a software application hosted by the mobile device 110 and/or monitoring server 120 using user credentials that identify the user. In some examples, the payout data may include an indication of the user credentials for the user that is requesting the physical cash payout.

In some embodiments, the payout data may identify a payee of the physical cash payout. The payee may include an individual, business, and/or any other entity that is the intended recipient of the physical cash payout. For example, the payee may be a vendor (e.g., food vendor, supply vendor, and/or the like), an individual (e.g., an employee of an organization, a contractor, etc.), and/or the like, that has incurred one or more expenses and/or has provided a service that may be compensated for with petty cash. In some examples, the payee may be selected from a drop-down of approved payees (e.g., approved individuals, vendors, etc.). In some examples, the payee and the payor may be the same individual. For instance, a payor may initiate a physical cash payout to reimbursement themselves (e.g., as a payee) for a business expense, such as a travel-related expense, and/or the like. For example, by automatically recording and validating a physical cash payout before controlling a user's access to the physical cash, the payout flow of the present disclosure may enable the secure, controlled, and monitored ability to initiate a self-payout for a user that minimizes concerns for exploitation of the system.

In some embodiments, the payout data may identify a type of physical cash payout. The type of payout may be based at least in part one or more approved payout types provided by an establishment. By way of example, the payout types may include an associate relations payout type, a customer satisfaction payout type, a travel-related payout type, a vendors and services payout type, and/or a miscellaneous payout type for covering extraordinary expenses. In some examples, the payout data may identify a reason for payout. The reason may include a sub-category of the payout type and/or a text description for the payout. In some examples, the reason may be selected from a drop-down of approved reasons for a particular payout type.

In some embodiments, the payout data identifies one or more expenses covered by the payout. Each of the one or more expenses may be based at least in part on the payout criteria and/or the payout type. By way of example, the one or more expenses may be selected from a list of approved expenses for a payout type. Each payout type may include one or more different payout expenses. For instance, a travel-related payout type may include one or more travel-related expenses, such as food, hotels, mileage, and/or the like. As another example, a customer satisfaction payout type may include one or more customer satisfaction expenses, such as product returns, reimbursements, and/or the like. In some examples, the one or more expenses may be selected from an expense overview that guides the user through possible expenses associated with a particular payout type. For instance, the possible expenses may be presented as a customizable list that allows a user to add and/or remove expenses for a particular payout based at least in part on the circumstances.

In some embodiments, the payout data identifies contextual data for one or more of the expenses. The contextual data, for example, may include a timing of the expense, a representation of the expense, an expense value, and/or the like. In some examples, each selected expense may be associated with contextual data that may be used to validate the expense.

In some examples, in response to the selection of an expense, the user may be prompted to provide contextual data for the particular expense. For instance, an expense may be associated with image data that may be used to validate an expense value. The image data, for example, may include a receipt representation of the expense. By way of example, the user may provide an image, record, and/or other representation of a receipt for an expense. The receipt, for example, may include a meal receipt for a requested travel expense, a previous purchase receipt for an item return, and/or the like. In this manner, the payout data may include a user input payout value (and/or one or more expense values) and image data that reflects an actual payout value. As described herein, the image data may be processed to automatically verify the user input payout value before providing access to the requested cash.

In addition, or alternatively, an expense may be associated with a travel distance that may be used to determine an expense value. In such a case, the contextual data for the expense may include an indication of the travel distance, one or more locations, and/or a route associated with the expense. By way of example, the payout data may include location data that reflects a start location and an end location for an expense of a physical cash payout. The location data may be manually input by the user (e.g., by selecting one or more physical addresses, etc.) and/or obtained from one or more sensors of the mobile device 110. By way of example, the mobile device 110 may include a plurality of location sensors, such as the location module described herein. In some embodiments, the location data may include current location data that reflects a user's current location. The current location data may be generated by one or more location sensors of a mobile device. In some examples, the end location of a payout may be determined based at least in part on the current location data.

In some examples, the mobile device 110 (e.g., in collaboration with the monitoring server 120) may automatically determine an expense value for a travel-related expense based at least in part on the location data. For example, the mobile device may determine, based at least in part on map data, a covered distance between the start location and the end location. The map data may include one or more publicly available maps that identify one or more available routes between various locations within a geographic area and/or one or more organization-specific maps that identify one or more approved routes between various locations within a geographic area. The covered distance may be determined based at least in part on one or more routes (as discoverable from the map data) between the start location and the end location. In some examples, the covered distance may include a travel distance for the shortest route between the start location and the end location. In some examples, the mobile device 110 (e.g., in collaboration with the monitoring server 120) may determine the expense value for the travel-related expense based at least in part on the covered distance. By way of example, the expense value may be indicative of a mileage cost for the covered distance. The mileage cost may be specific to the organization. In some embodiments, the mileage cost may include a government rate for mileage.

In some embodiments, the payout data may identify a payout value for the physical cash payout. The payout value may be input by the user. In addition, or alternatively, the payout value may be automatically determined based at least in part on input from the user. By way of example, the payout value may be determined based at least in part on an aggregation of one or more expense values previously input by the user and/or determined by the mobile device 110 (e.g., in collaboration with the monitoring server 120).

In some embodiments, the payout data may include vendor validation data for the physical cash payout. By way of example, the validation data may include tax-related data for ensuring that vendors who provide contract work through service or products properly pay taxes. In some examples, the validation data may include a record W-9 for the payee. Each organization may have their own process for dealing with these documents. To accommodate each of these processes, the mobile device 110 (e.g., in collaboration with the monitoring server 120) may determine whether an expense and/or payout is flagged as a vendor product and/or service that requires particular documentation. In the event that an expense and/or payout is flagged, the mobile device 110 (e.g., in collaboration with the monitoring server 120) may access the particular documentation and/or provide a link to the user that allows the user to complete the required information.

In some embodiments, the payout data may include verification data for the physical cash payout. The verification data may identify a particular payor and/payee using one or more secured designation (e.g., signatures, security marks, etc.) to monitor and/or track the activities of various users and/or payees across multiple physical cash payouts. For example, the user and/or payee may be prompted with an overview of the physical cash payout and prompted for a signature from each of the parties. In some embodiments, the payout flow may be locked until a signature is provided by each party.

In some embodiments, the payout data may be associated with an organizational identifier. The organizational identifier may identify an organizational entity (e.g., establishment, parent organization, etc.) that governs a physical cash payout. In some examples, the organizational identifier may include a customer specific key that corresponds to the organizational identifier.

The mobile device 110 may provide the payout data to the monitoring server 120. For example, as reflected by Block 504, the monitoring server 120 may receive the payout data from the mobile device 110 in response to user input to the plurality of user interfaces. In some examples, the monitoring server 120 may continuously receive the payout data as the user interacts with various user interface screens of a payout flow. For example, the mobile device 110 and monitoring server 120 may collaboratively interact while the user performs a payout flow to perform one or more operations described herein. In addition, or alternatively, the mobile device 110 may be configured to generate the payout data by aggregating payout information from user input provided at each user interface and then provide payout data to the monitoring server 120 after the user has completed the payout flow.

The monitoring server 120 may process the payout data to automatically initiate a physical cash payout for the user from at least one of the CHDs 130 and/or POS terminals 140. Specifically, the monitoring server 120 may initiate a physical cash payout from a device by sending executable data to the device, which causes one or more physical cash movement mechanisms within the device to dispense the amount of cash and/or to enable access to the physical cash by a user (e.g., to actuate a locking mechanism to open a cash drawer of the device, etc.).

In some embodiments, as reflected by Block 505, the monitoring server 120 may verify the payout data. Verifying the payout data may include analyzing one or more different portions of the payout data to ensure that a requested payout (i) is accounted for by legitimate business expenses (e.g., predetermined expenses approved by an organization, etc.), (ii) is provided to an authorized payee, (iii) is acknowledged by one or more parties, and/or the like. For example, the payout data may be verified in accordance with one or more verification measures of an organization to ensure that a requested payout is provided for legitimate business purposes. The verification measures may depend on the organization, but may include different actions, such as tax verifications, manual authorizations (e.g., through signatures, etc.), amount verifications, and/or the like, to ensure that a cash payout is provided for an appropriate amount to an authorized payee for an authorized business purpose. For instance, the monitoring server 120 may process one or more portions of the payout data to ensure that the payout value and/or one or more other aspects of the requested payout are valid in accordance with one or more verification measures. For example, the monitoring server 120 may verify (i) whether valid tax documents are available for a vendor payee to ensure that a payee is authorized to accept a cash payout, (ii) a signature provided by the payor and/or payee to ensure that the payee and/or payor have acknowledged the payout, (iii) a type of payout and/or timing of the payout to ensure that the payout is made for a legitimate business purpose, (iv) the payout value of the payout to ensure that the payout amount is accounted for by one or more legitimate business expenses, among other verification tasks.

In one example, the monitoring server 120 may process image data for a payout to verify one or more expense values and/or a payout value for a physical cash payout. By way of example, the monitoring server 120 may be configured with one or more optical character recognition (OCR) models for identifying, extracting, and/or interpreting text from image data. The OCR models may include any model, such as Tesseract, TensorFlow, and/or any other machine learning or rule based model. The monitoring server 120 (e.g., in collaboration with the mobile device 110) may extract, using the one or more OCR models, an actual payout value from the image data for an expense of a payout and verify, based at least in part on the actual payout value, a user input payout value for the expense that is provided by the user.

In some embodiments, as reflected by Block 506, the monitoring server 120 may generate cash authorization instructions for accessing cash to enable a physical cash payout. To prevent misuse, theft, and/or exploitation of cash payout processes, the monitoring server 120 is configured to verify a requested payout before generating cash authorization instructions for accessing the cash for a physical cash payout. In this manner, the physical cash payout may be automatically verified before cash is accessible to a user, thereby allowing the performance of physical cash payouts by any user at any time without detrimentally impacting the accountability of cash flow at an establishment.

The cash authorization instructions may depend on the organization and/or the payout data. For example, the payout data may identify a dispensing location for dispensing the cash required for the physical cash payout. In some examples, the dispensing location may identify the CHD 130. In such a case, the monitoring server 120 may generate cash authorization instructions for accessing cash within the CHD 130. The cash authorization instructions, for example, may include access dispensing instructions for dispensing cash from the CHD 130 in the verified amount of the requested physical cash payout. When provided to the CHD 130, the access dispensing instructions may be configured to control the CHD 130 to dispense cash to satisfy the physical cash payout and/or unlock access to cash stored within the CHD 130.

In some examples, the access dispensing instructions may be associated with access credentials for initiating the access dispensing instructions at the CHD 130 from a remote device. The access credentials, for example, may include a unique code, a security key, and/or the like, for securely identifying the access dispensing instructions from a remote device, such as the mobile device 110. In some examples, the monitoring server 120 may generate access instructions that reflect the access credentials and transmit the access instructions to the mobile device 110, as reflected by Block 507. The mobile device may receive the access instructions and use the access instructions to access cash at the CHD 130.

For example, as reflected by Block 508, the mobile device 110 may present the access credentials to the CHD 130 (e.g., via a data reader as described herein) using the access instructions. By way of example, the access instructions may include a QR code, a barcode, and/or any other image representation that identifies the one or more access credentials for the payout. The CHD 130 may decode the access instructions to identify the access credentials for the payout and, as reflected by Block 509, provide access to the cash for the physical cash payout. For example, the CHD 130 may dispense the amount of cash required for the physical cash payout and/or unlock access to cash stored within the CHD 130.

In some examples, the CHD 130 may collaborate with the monitoring server 120 to provide access to the cash for the physical cash payout. For example, the CHD 130 may identify the access credential from the access instructions and match the access credentials to a pending payout reflected by the cash authorization instructions generated by the monitoring server 120. In some embodiments, the CHD 130 may provide access to the cash for the physical cash payout in response to the match.

In some embodiments, a CHD controller may be configured to monitor an amount of cash within the CHD 130 and/or any occurrences in which cash is withdrawn and/or deposited from/to the CHD 130. When providing access to cash for a physical cash payout, for example, the CHD controller may generate and store cash distribution data indicative of the cash payout. The cash distribution data may include a user identifier, an amount of cash (and the denominations of those distributions) withdrawn, and/or additional metadata associated with the payout, such as the date and/or time of the payout, and/or the like. In some embodiments, the cash distribution data may be provided to the monitoring server 120, as reflected by Block 510. The cash distribution data may be provided in real time (e.g., as a payout is performed) and/or at one or more time intervals (e.g., operational time periods, etc.).

In some embodiments, as reflected by Block 511, the monitoring server 120 may generate a payout data object that reflects the physical cash payout. For example, the payout data object may include the payout data for the physical cash payout.

In various embodiments of the present disclosure, the payout data object may include a record for a physical cash payout that maps user input to real-world transaction data in a single data structure to provide an auditable and traceable record of the physical cash payout, as well as the cash payout flow. For example, the user input may include the payout data received through the mobile device 110 and/or metadata associated therewith, such as a device identifier for the mobile device 110, an internet protocol address associated with the messages from the mobile device 110, one or more timestamps for the messages, a session duration, and/or the like. The real-world transaction data may include cash distribution data recorded by the CHD 130 during the execution of a payout transaction.

The payout data and the real-world transaction data may be processed in real time (and/or at a predetermined interval, such as after a shift, etc.) to securely track, monitor, and/or authorize the execution of a physical cash payout. The payout data, for example, may be indicative of a requested cash amount. The cash distribution data may record an actual cash amount withdrawn from the CHD 130, for example, as recorded by one or more weight sensors, optical sensors, and/or the like of the CHD 130. In some embodiments, the monitoring server 120 may compare the actual cash amount to the requested cash amount to link a cash deficit to the physical cash payout. In the event that the requested cash amount matches the actual cash amount withdrawn, the payout data object may be flagged as an authorized transaction. In the event of a discrepancy between the requested cash amount and the actual cash amount withdrawn, the payout data object may be flagged as an unauthorized transaction.

In some embodiments, the monitoring server 120 may initiate one or more security actions to proactively track and address unauthorized transactions. By way of example, the monitoring server 120 may initiate one or more alerts to the mobile device 110, the CHD 130, and/or any other device associated with an organization and/or establishment. In addition, or alternatively, the security actions may include locking one or more devices (e.g., via a CHD controller, etc.), flagging a user account (e.g., a payee, payor, etc.) associated with the cash payout, initiating one or more on-premises alarms, and/or the like.

In some embodiments, as reflected by Block 512, the monitoring server 120 may store the payout data object. In some examples, the monitoring server 120 may store the payout data object using an organization identifier. For example, the payout data object may be stored in an encrypted data store based at least in part on the organizational identifier. As an example, the payout data object may be stored in one or more files maintained by a cloud server, such an Azure blob storage encrypted with an organizational identifier (e.g., an organization-specific key, etc.), to prevent the occurrence of data leakage. In some examples, one or more portions of the payout data object may be stored in one or more different portions of memory based at least in part on the payout data. For instance, the payout data object may be stored in a particular general ledger (GL) based at least in part on the payout type. As an example, a plurality of payout types (e.g., cash payout categories, etc.) may be mapped to a proper GL required by an organization to allow for reduced work when integrating with the payout flow described herein.

The GL mappings may be dynamically tailored to an organization. In this manner, the techniques of the present disclosure may enable the real-time recordation and storage of physical payouts that are tailored to legacy storage mechanisms of an organization.

As examples, the GL mappings may include high-level, payout-level mappings; granular, expense-level mappings; and/or the like. A payout-level mapping, for example, may map a payout data object to a particular GL code of a GL for an organization based at least in part on a payout type. By using payout-level mappings, an entire payout data object may be stored in one central location. For example, the payout-level mapping may map an associate relations payout type to an associate relations GL code, a customer satisfaction payout type to a customer satisfaction GL code, a travel-related payout type to a travel GL code, a vendors and services payout type to a vendor GL code, and/or like. Expense-level mappings may map individual components of a payout to different GL codes. For example, an expense-level mapping may map each expense identified by a payout data object to one or more different GL codes. By way of example, an accommodation expense for a travel-related payout may be mapped to an accommodation GL code, whereas a milage expense for the same travel-related payout may be mapped to a milage GL code. In this manner, granular, expense-level mappings may be used to break-down a payout data object in real time to enable real time analytics and insights as payouts are initiated across an organization. By doing so, real time trends may be tracked to detect anomalous behavior (e.g., an uptick in product returns, etc.) related to previously untraceable cash-based operations.

Remote Execution of Physical Cash Payouts at Multiple Locations

As described above, physical cash payouts may be remotely and automatically executed using some of the payout flow processes of the present disclosure. These processes improve upon traditional methods for accessing and accounting for cash-based payments at a brick and mortar store. By utilizing the techniques herein, an organization may improve a user's accessibility to cash needed in a fast paced business environment, while monitoring access patterns to detect and prevent misuse, theft, and exploitation of a cash-based system. These benefits may be further realized by allowing controlled access to cash within register tills located at various, easily accessible locations throughout a brick and mortar establishment of the organization.

Allowing access to cash from a plurality of locations within an establishment for physical cash payouts, while maintaining accurate records of those physical cash payouts presents a number of technical challenges. For example, traditional systems for handling and tracking physical cash flow at an establishment limit payout transactions to between external parties and a CHD 130. Thus, traditionally, the cash required to perform physical cash payouts must be retrieved from a CHD 130 to ensure those cash payouts are monitored separately from traditional purchase transactions with customers. Therefore, those cash payouts are not traditionally performed from cash within register tills associated with the POS terminals 140 distributed at various locations within the establishment. Some embodiments of the present disclosure provide technical improvements over traditional systems by simulating interactions between a CHD 130 and one or more POS terminals 140. These techniques may be practically applied in a cash payout setting to allow secured and monitored access to cash stored within a plurality of easily accessible register tills.

As reflected by Block 601, the payout data may be generated and transmitted by a mobile device 110. As described with respect to FIG. 5 and reflected by Block 602, the monitoring server 120 may receive payout data reflective of a requested physical cash payout at an establishment. As described herein, the payout data may include payor data, payee data, justification data, categorical data, expense data, value data, temporal data, location data, and/or any other information that may be related to a physical cash payout.

In some embodiments, the payout data comprises location data that identifies a dispensing location for dispensing the cash required for the physical cash payout. As described above, the dispensing location may be a CHD 130. In addition, or alternatively, the dispensing location may be a register till with a POS terminal 140. The register till may be associated with a CHD 130, so that the register till receives cash from the associated CHD 130 and deposits cash into the associated CHD 130 (e.g., at the end of an operational time period, such as a shift, etc.). Moreover, the register till may be associated with the CHD 130 using identifying data-so that an identifier associated with the register till (and/or a profile associated with the register till) is linked with an identifier of the CHD 130 (and/or a profile of the CHD). For example, these device identifiers may be stored in a hierarchy-such that the register till identifier is nested within a CHD identifier.

In certain embodiments, the user interfaces of the present disclosure may include a dispense payout screen that allows a user to select the CHD 130 and/or at least one of a plurality of register tills within an establishment. By selecting at least one register till, the user can execute a physical cash payment where they are currently located, while the cash payout is accurately tracked (and attributed to the associated CHD 130). The at least one register till, for example, may be associated with a POS terminal 140 that is within a proximity of the user.

In some embodiments, the monitoring server 120 receives payout data for a user that includes at least one register till identifier for at least one register till of one or more register tills within the establishment. For example, in response to a selection of the at least one register till, the mobile device 110 may retrieve the register till identifier (e.g., from a register till look-up table, and/or the like) for the register till, augment the payout data with the register till identifier, and/or transmit data indicative of the register till identifier to the monitoring server 120.

In some examples, the monitoring server 120 may cause, based at least in part on the payout data, the POS terminal 140 to allow access to the cash. For example, at least partially in response to receiving a register till identifier, the monitoring server 120 may cause (e.g., through collaboration with the POS terminal 140), the register till corresponding to the identifier to dispense cash to satisfy a physical cash payout and/or to unlock access to cash stored within the register till.

For example, as described herein, a POS terminal 140 may include a POS terminal controller and/or one or more register tills. In some embodiments, the one or more register tills include one or more storage mechanisms for storing cash and/or one or more mechanical and/or logical control components for allowing access to the cash and/or physically moving the cash to and/or from the one or more storage mechanisms. The mechanical and/or logical control components, for example, may be configured to execute one or more cash management operations to accept and/or dispense cash for one or more recognized business purposes. The control components may include one or more mechanical mechanisms for unlocking and/or moving the container (e.g., if movable) or moving the cash within the container. The mechanical mechanisms may include one or more actuators, conveyors, pumps, lifts, and/or the like, that may be driven by one or more mechanical/electrical motors and/or other components for moving a container and/or the cash within a container. In some examples, the mechanical mechanisms may be integrated with logical components, such as software, firmware, and/or the like that may be configured to control the operation of the mechanical mechanisms.

In some embodiments, the POS terminal controller is electrically (e.g., through one or more conductive wires, cables, etc.) and/or wirelessly (e.g., through one or more transmitters, receivers, etc. configured for one or more radio wave, microwave, and/or the like frequencies) connected to the control components of the one or more register tills. In some examples, in response to instructions from the monitoring server 120, the POS terminal controller may be configured to communicate instructions to one or more control components of the one or more register tills to allow access to cash for a cash management operation. Access to cash may be initiated by causing the control components to unlock and/or open a register till (e.g., actuating a lock, allowing a spring-biased drawer to open, etc.). In addition, or alternatively, access to cash may be initiated by causing the control components to activate one or more mechanical mechanisms to move cash within a register till to a cash dispensing mechanism.

In some embodiments, the monitoring server 120 simulates interactions between the CHD 130 and the POS terminal 140 to enable the secure, monitored, and tracked access to register tills within an establishment, as reflected by Block 603. For example, the monitoring server 120 may generate a simulated interaction based at least in part on the payout data. The simulated interaction may reflect an interaction between the CHD 130 and the register till. The simulated interaction, for example, may simulate the physical removal of cash from the CHD 130 to perform a cash payout (e.g., a virtual cash payout) and the physical removal of cash from the register till to add cash to the CHD 130 (e.g., a virtual skim). By simulating both interactions, the monitoring server 120 enables a new, previously unavailable, physical action of removing the cash for a cash payout directly from a register till.

The simulated interaction may include a simulated pick-up transaction for the register till, as reflected by Block 604. The simulated pick-up transaction may include a virtual skim operation from the register till in which cash is withdrawn and deposited to the CHD 130. The monitoring server 120 may generate the simulated pick-up transaction for the register till to account for the removal of cash for a physical cash payout. In some examples, the monitoring server 120 may transmit data indicative of the simulated interaction to the POS terminal 140 of the register till. By way of example, a cash amount of the pick-up transaction may be provided to POS terminal 140 to update a cash balance, notify an attendant, and/or the like.

The simulated pick-up transaction is tailored to the functionalities of the POS terminal 140 and leverages existing capabilities of the system to allow access to cash from a register till. For example, traditional POS terminals may be configured to dispense cash for various purposes, such as for cash management operations at the close of business. The simulated pick-up transaction may simulate a cash dispensing operation that is recognized by the POS terminal 140. In this manner, the POS terminal 140 may be caused to perform a traditionally non-recognizable action (e.g., physical cash payout) based at least in part on recognized operations without knowledge that the recognized operations (e.g., the simulated pick-up transaction) are simulated.

The simulated pick-up transaction may depend on the functionalities of the POS terminal 140 and may be tailored to a particular POS terminal on a case by case basis. The simulated pick-up transaction may include simulation data for satisfying one or more reconciliation parameters for an organization and/or establishment. For instance, the simulation data may be indicative of one or more aspects of the payout data including, for example, payor data, value data, temporal data, and/or the like. In some examples, the simulated data may include transformed payout data that is formatted for recording a secure and recognized business operation. For instance, the payor data may be transformed to authorizing party data for recording an employee, manager, and/or the like that authorizes a skimming operation, a withdrawal operation, and/or the like. As another example, the value data may be transformed to a skimming amount, withdrawal amount, and/or the like, for identifying a simulated amount of cash (at a denominational level) that is skimmed or otherwise transferred from a register till. For simulated transactions that occur at a denominational level, the simulated transaction specifies the amount of each denomination of cash that is withdrawn from the register till, for example, by specifying the quantity of notes of a first denomination (e.g., $20 bills) that are withdrawn, the quantity of notes of a second denomination (e.g., $10 bills) that are withdrawn, the quantity of notes of a third denomination (e.g., $1 bills) that are withdrawn, and/or the like. As yet another example, the temporal data may be transformed from a time stamp for a cash payout to a time stamp for a skimming operation, a withdrawal operation, and/or the like.

In some embodiments, the POS terminal 140 generates real-world cash utilization data based at least in part on the cash physically dispensed and/or received at the POS terminal 140. The POS terminal 140, for example, may monitor the amount of cash involved in particular transactions including an amount of cash dispensed out and/or an amount of cash received into the POS terminal 140 via cash verification mechanisms (e.g., optical-based cash verification mechanisms within the POS terminal 140).

In various embodiments, the cash utilization data may include data indicative of one or more cash management transactions, such as data indicative of advances and/or pick-ups to/from a POS terminal 140. The advances may be embodied as cash delivery transactions for providing additional cash to the POS terminal 140 (e.g., from the CHD 130), and may be identified as either "full" or "partial" advances, indicating that the POS terminal 140 required a full refill of cash or only a partial refill of cash. Similarly, pick-ups may be indicative of cash removed from the POS terminal 140, and can be identified as either "full" or "partial" pick-up, indicating that the POS terminal 140 required a pick-up of all funds therein or only a portion of the funds therein. Corresponding data objects indicative of these cash management transactions may comprise data indicative of a timestamp at which the transaction occurred, the type of transaction (e.g., advance or pick-up), the amount of cash involved (which may be identified at a denominational level), and/or the like. In some embodiments, the simulated pick-up transaction may simulate a partial pick-up of funds from a register till of the POS terminal 140 in the amount of a requested payout. The simulated pick-up transaction may include simulated data (e.g., transformed from the payout data) for reconciling cash utilization data recorded by the POS terminal and identifying a pick-up of funds from the POS terminal 140.

In some embodiments, a POS terminal 140 may operate in one or more transaction modes. For instance, during normal business operations, the POS terminal 140 may operate in a cash transaction mode used for executing customer-facing transactions. During the cash transaction model, the POS terminal 140 may tag transactions with metadata that identifies the transaction as a customer transaction. In some examples, the POS terminal 140 may transition to a cash management mode of operation to perform an advance and/or pick-up of funds. During the cash management mode, the POS terminal 140 may tag transactions with metadata that identifies the transaction as a cash management transaction. The cash management mode of operation enables the POS terminal 140 and the monitoring server 120 to distinguish between customer-facing transactions and cash management. Thus, when cash is dispensed as a part of a cash management transaction for transferring cash between a POS terminal 140 and a CHD 130, transaction data generated as a part of the transaction may be tagged with metadata as a cash management transaction, whereas customer-facing transactions (e.g., purchases, refunds, and/or the like) may be tagged with metadata as primary transactions.

To facilitate the secure cash flow at an establishment, the POS terminal 140 may be restricted from entering a cash management mode, and therefore from performing a cash management transaction for executing a physical cash payout, unless one or more security measures are satisfied. The security measures may be specific to an organization and/or establishment. In some examples, the security measures may include personnel authorizations (e.g., manager approval, etc.), timing windows (e.g., during normal business hours, etc.), and/or the like to prevent access to cash through a POS terminal 140 for illegitimate purposes. In some embodiments, the simulated pick-up transaction may include simulation data that is tailored to these security measures. For examples, the simulated pick-up transaction may include a payee signature, a time stamp, and/or the like for allowing the POS terminal to securely transition to a cash management mode.

As another example, the simulated interaction may include a simulated payout transaction for the CHD 130, as reflected by Block 605. The simulated payout transaction may include a virtual payout operation from the CHD 130 in which cash is dispensed from the CHD 130 for handling a cash payout. The monitoring server 120 may generate the simulated payout transaction for the CHD 130 to simulate the removal of cash for a physical cash payout. In some examples, the monitoring server 120 may transmit data indicative of the simulated interaction to the CHD 130. By way of example, a cash amount of the pick-up transaction, the payout transaction, and/or the like may be provided to the CHD 130 to update a cash balance, notify an attendant, and/or the like.

The simulated interaction is tailored to the functionalities of the POS terminal 140 and/or the CHD 130. For example, as described herein, a CHD 130 may be configured to advance and/or pick-up cash from a POS terminal 140 throughout an operational time period and/or to dispense cash from the CHD 130. Cash management transactions including cash distributions to specific register tills and/or cash pick-ups from register tills are recorded by both the POS terminal 140 (e.g., as cash utilization data) and the CHD 130 (e.g., as cash distribution data, etc.). For example, as described herein, the CHD 130 may include a CHD controller configured to monitor an amount of cash within the CHD 130 and/or an amount dispensed and/or distributed to a POS terminal 140. When distributing cash to a register till of a POS terminal 140, for example, the CHD controller may generate and store cash distribution data indicative of the cash distribution to the register till. The cash distribution data may include a register till identifier, an amount of cash (and the denominations of those distributions) distributed, and/or additional metadata associated with the transaction, such as the date and/or time of the distribution, a user identifier associated with the transaction, and/or the like.

In some embodiments, the simulated pick-up transaction and the simulated payout transaction may simulate cash distribution data for the CHD 130. For example, the simulated pick-up transaction may simulate a cash pick-up operations from a register till of the POS terminal, whereas the simulated payout transaction may simulate cash dispensing operations from the CHD 130. For instance, the simulated pickup transaction may include simulation data that includes transformed payout data formatted for recording a cash pick-up operation from the register till to the CHD 130. For instance, the at least one register till identifier may be used as a register till identifier for a simulated cash pick-up from the register till. The payor data may be transformed to a user identifier associated with the cash pick-up for recording an employee, manager, and/or the like that authorizes the cash pick-up. The value data may be transformed to a pick-up amount for identifying a simulated amount of cash that is picked-up from the register till. The temporal data may be transformed from a time stamp for a cash payout to a time stamp for a cash pick-up. In this manner, the simulated pickup transaction may leverage the payout data to simulate aspects of a cash pick-up, recognizable to both the POS terminal 140 and the CHD 130.

In addition, or alternatively, the simulated payout transaction may include simulation data that includes transformed payout data formatted for recording a cash dispensing operation from the CHD 130. The payor data may be transformed to a user identifier associated with the cash dispending operation for recording an employee, manager, and/or the like that authorizes the cash withdrawal. The value data may be transformed to a dispending amount for identifying a simulated amount of cash that is dispensed from the CHD 130. The temporal data may be transformed from a time stamp for a cash payout to a time stamp for a cash withdrawal from the CHD 130. In this manner, the simulated payout transaction may leverage the payout data to simulate aspects of a cash dispensing operation, recognizable to the CHD 130.

To facilitate secure cash flow at an establishment, the CHD 130 may be restricted from executing a cash dispensing operation unless one or more security measures are satisfied. The security measures may be specific to an organization and/or establishment. In some examples, the security measures may include personnel authorizations (e.g., manager approval, etc.), timing windows (e.g., during normal business hours, etc.), and/or the like, to prevent access to cash through a CHD 130 for illegitimate purposes. In some embodiments, the simulated payout transaction may include simulation data that is tailored to these security measures. For example, the simulated payout transaction may include payee signature, a time stamp, and/or the like for allowing the CHD 130 to securely execute and record a cash dispensing operation.

To execute a physical cash payout from the register till of the POS terminal 140, the monitoring server 120 may generate the simulated interaction including both the simulated pick-up transaction and the simulated payout transaction in near real-time. In this manner, a cash payout from a CHD 130 may be simulated (e.g., via a simulated payout transaction) in concert with a cash pick-up from the register till (e.g., via a simulated pick-up transaction). In some examples, the simulated pick-up transaction and the simulated payout transaction may be generated relative to each other to simulate an end-to-end cash flow sequence. For instance, a time stamp for the simulated cash advance may be offset from a time stamp for the simulated pick-up transaction. By way of example, the simulated pick-up transaction may be assigned a time stamp from the payout data to execute a physical cash payout in real time for a user and, in some examples, the simulated payout transaction may be assigned an offset time stamp that is offset from the temporal data of the payout data to succeed the simulated payout transaction. In this way, the POS terminal 140 may be configured to execute a real-time cash payout by simulating a cash pick-up from the POS terminal 140, while the cash expenditure may be accounted for by a subsequent cash payout simulated from the CHD 130.

At least a portion of the simulation data for the simulated pick-up transaction may be provided to the POS terminal 140 and/or the CHD 130 to account for a cash differential at the register till of the POS terminal 140 (between an actual and an expected amount of physical cash stored therein) without physically moving cash from the CHD 130. This simulated pick-up transaction data may provide denomination-specific data of cash removed from the register till of the POS terminal 140 to account for differences between the amount of physical cash of each denomination stored in the register tills of the POS terminal 140 and the amount of physical cash expected to be stored within the POS terminal 140 on a denominational level (e.g., the quantity of $20 bills, the quantity of $10 bills, etc.). For example, the simulated pick-up transaction may include simulation data indicative of a cash withdrawal operation from a register till that may be provided to the POS terminal 140 to adjust a cash balance (e.g., by decreasing the cash balance by the payout amount of each denomination and/or in the aggregate, etc.), alert a user, and/or the like at the POS terminal 140. In addition, or alternatively, the simulated pick-up transaction may include simulation data indicative of a cash deposit operation at the CHD 130 that may be provided to the CHD 130 (and/or the CHD controller, etc.) to adjust a cash balance (e.g., by increasing the cash balance of each affected denomination of cash, etc.), alert a user, and/or the like at the CHD 130.

In addition, or alternatively, at least a portion of the simulation data for the simulated payout transaction may be provided to the CHD 130 (and/or the CHD controller, etc.). For instance, the simulated payout transaction may include simulation data indicative of a cash dispensing operation from the CHD 130 that may be provided to the CHD 130 (and/or the CHD controller, etc.) to adjust a cash balance (e.g., by decreasing the cash balance, etc.), alert a user, and/or the like at the CHD 130. In this way, a cash balance at the CHD 130 may be artificially modified by two counterbalancing operations (e.g., a cash dispensing operation and a cash deposit operation) to simultaneously (and/or near simultaneously) increase and then decrease a cash balance at the CHD 130 without physically moving cash from or to the CHD 130. In some examples, the counterbalancing operations may cancel out before impacting a balance at the CHD 130, thereby eliminating the need to artificially modify the cash balance at the CHD 130 for a physical cash payout. By tying together two independent simulated transactions in near real-time, the monitoring server 120 may simulate multiple counterbalancing actions such that the amount of physical cash within the CHD 130 accurately reflects the amount of cash that is electronically associated with the CHD 130. As a result, cash may flow directly from a register till of the POS terminal 140, while accounting for the cash deficit at an establishment that accurately represents available balances across each of the devices of the establishment, including the POS terminal 140 and the CHD 130.

In some embodiments, as reflected by Block 606, the monitoring server 120 may generate cash authorization instructions for accessing cash to enable a physical cash payout. To prevent misuse, theft, and/or exploitation of cash payout processes, the monitoring server 120 may be configured to verify a requested payout before generating cash authorization instructions for accessing the cash for a physical cash payout. In this manner, the physical cash payout may be automatically verified before cash is accessible to a user, thereby allowing the performance of physical cash payouts by any user, at any time, and from any location, without detrimentally impacting the accountability of cash flow at an establishment.

The cash authorization instructions may depend on the organization and/or the payout data. For example, the cash authorization instructions may be based at least in part on the register till corresponding to a register till identifier of the payout data. For instance, the monitoring server 120 may generate cash authorization instructions for accessing cash within the register till based at least in part on the register till identifier. The cash authorization instructions, for example, may include access dispensing instructions for dispensing cash from the register till in the verified amount of the requested physical cash payout. When provided to a POS terminal 140 of the register till, the access dispensing instructions may be configured to control the POS terminal 140 to dispense cash to satisfy the physical cash payout and/or unlock access to cash stored within the register till.

In some examples, the access dispensing instructions may be associated with access credentials for triggering the access dispensing instructions at the POS terminal 140 from a remote device. The access credentials, for example, may include a unique code, a security key, and/or the like, for securely identifying the access dispensing instructions from a remote device, such as the mobile device 110. In some examples, the monitoring server 120 may generate access instructions that reflect the access credentials and transmit the access instructions to the mobile device 110, as reflected by Block 607. The mobile device 110 may receive the access instructions and use the access instructions to access cash at a register till (e.g., via the POS terminal 140).

For example, as reflected by Block 608, the mobile device 110 or a user thereof may present the access credentials to the POS terminal 140 (e.g., via a data reader as described herein) using the access instructions. By way of example, the access instructions may include a QR code, a barcode, and/or any other image representation that identifies the one or more access credentials for the cash payout. As other examples, the access instructions may be presented via other wireless technologies, such as Bluetooth or other short-range radio-based wireless communication protocols. The POS terminal 140 may decode the access instructions to identify the access credentials for the cash payout and, as reflected by Block 609, provide access to the cash for the physical cash payout. For example, the POS terminal 140 (e.g., a POS terminal controller, etc.) may dispense the amount of cash (e.g., by activating one or more mechanical mechanisms to move cash within a register till to a cash dispensing mechanism, etc.) required for the physical cash payout. As another example, the POS terminal 140 (e.g., a POS terminal controller, etc.) may unlock access to cash stored within the register till (e.g., unlocking and/or opening a register till by actuating a lock, allowing a spring-biased drawer to open, etc.).

In some examples, the POS terminal 140 may collaborate with the monitoring server 120 (and/or the CHD 130) to provide access to the cash for the physical cash payout. For example, the POS terminal 140 may identify the access credentials from the access instructions and match the access credentials to a pending payout reflected by the cash authorization instructions generated and stored at the monitoring server 120. In some embodiments, the POS terminal 140 may provide access to the cash for the physical cash payout in response to the match.

In some embodiments, as described herein, the POS terminal 140 may be configured to provide access to cash for cash management transactions. To do so, in some examples, the POS terminal 140 may be transitioned to a cash management mode. In some embodiments, the POS terminal 140 may be transitioned to a cash management mode upon the occurrence of an appropriate trigger event. For example, the POS terminal 140 may be configured to enter the cash management mode upon receipt of user input from an authorized user, and/or the like. In some embodiments, the access instructions, and/or the access credentials represented by the access instructions, may trigger (e.g., when scanned by a data reader of the POS terminal 140, etc.) the POS terminal 140 to enter the cash management mode. Once in the cash management mode, the POS terminal 140 may perform a cash management transaction to enable access to cash stored within a register till of the POS terminal 140, in accordance with the cash authorization instructions.

As described herein, when cash is dispensed and/or otherwise made available (e.g., by unlocking a storage mechanism, etc.) as part of a cash management transaction, the POS terminal 140 may record transaction data that may be tagged with metadata as a cash management transaction. In some embodiments, the POS terminal 140 may facilitate a physical cash payout by performing a cash management transaction, without knowledge of the physical cash payout. Transaction data may be recorded and tagged in the same (and/or substantially the same) manner as traditional cash management transactions and provided to the monitoring server 120, as reflected by Block 610. In this manner, the cash payout flow of the present disclosure may be tailored to legacy cash-based systems without altering any existing business practices.

In some embodiments, as reflected by Block 611, the monitoring server 120 may generate a payout data object that reflects the physical cash payout and/or the simulated interaction between the POS terminal 140 and CHD 130. For example, a payout data object may include the payout data for the physical cash payout and/or data reflective of the simulated interaction (e.g., a simulated pick-up transaction, simulated payout transaction, etc.).

In various embodiments of the present disclosure, the payout data object may include a record for a physical cash payout that maps user input, simulated data, and real-world transaction data in a single data structure to provide an auditable and traceable record of the physical cash payout, as well as the cash payout flow. For example, the user input may include the payout data received through the mobile device 110 and/or metadata associated therewith, such as a device identifier for the mobile device 110, an internet protocol address associated with the messages from the mobile device 110, one or more timestamps for the messages, a session duration, and/or the like. The simulated data may include the simulation data for the simulated pick-up transaction for the POS terminal 140 and/or the CHD 130 (e.g., including the cash withdrawal operation and/or the cash deposit operation) and/or the simulated payout transaction for the CHD 130. The real-world transaction data may include transaction data recorded by the POS terminal 140 during the performance of a cash management operation to indirectly execute a payout transaction.

The payout data, the simulated data, and the real-world transaction data may be processed in real time (and/or at a predetermined interval) to securely track, monitor, and/or authorize the execution of a physical cash payout. The payout data, for example, may be transformed to create simulation data for simulating device to device interactions for executing a physical cash payout for a requested cash amount. The transaction data may record an actual cash amount withdrawn from a POS terminal 140, for example, recorded by one or more weight sensors, optical sensors, and/or the like of the POS terminal 140. In some embodiments, the monitoring server 120 may compare the actual cash amount to the requested cash amount to link a cash deficit to the physical cash payout. In the event that the requested cash amount matches the actual cash amount withdrawn, the payout data object may be flagged as an authorized transaction. In the event of a discrepancy between the requested cash amount and the actual cash amount withdrawn, the payout data object may be flagged as an unauthorized transaction.

In some embodiments, the monitoring server 120 may initiate one or more security actions to proactively track and address unauthorized transactions. By way of example, the monitoring server 120 may initiate one or more alerts to the mobile device 110, the CHD 130, the POS terminal 140, and/or any other device associated with an organization and/or establishment. In addition, or alternatively, the security actions may include locking one or more devices (e.g., via the POS controller, CHD controller, etc.), flagging a user account (e.g., a payee, payor, etc.) associated with the cash payout, initiating one or more in-establishment alarms, etc.

The monitoring server 120 may store the payout data object, as reflected by Block 612. The payout data object may be stored in a short-term and/or long-term memory for one or more cash verification and/or auditing procedures. For example, the payout data object may be stored in one or more files maintained by a cloud server for one or more data aggregation and/or auditing processes. In some examples, the payout data object may be stored for one or more short-term cash reconciliation operations.

For example, the payout data object may be leveraged to enhance cash reconciliation processes for an establishment, as reflected by Block 613. By way of background, some POS terminals 140 may be associated with register tills that are advanced cash at the beginning of an operational time period (e.g., one or more hours, a day, a week, quarterly, etc.) from the CHD 130. At the end of the operational time period, the register tills may be checked-in to the CHD 130 to reconcile cash flow at an establishment. During a cash reconciliation process, the CHD 130 and/or the monitoring server 120 may identify a register balance and compare the register balance to one or more transactions (e.g., customer-facing transactions, cash management transactions, and/or the like) recorded by the POS terminal 140.

In some examples, one or more payout data objects (e.g., locally stored payout data objects generated during the operational time period, etc.) may be retrieved to reconcile discrepancies between a register balance and the one or more transactions. For example, the one or more payout data objects may be compared against one or more of the transactions to identify a matching payout data object for at least one of the transactions. The matching payout data object, for example, may be identified based at least in part on a timing, cash amount, and/or any other attribute of the at least one transaction. In some embodiments, the matching payout data object may be updated with transaction data indicative of the at least one transaction to link the at least one transaction to a physical cash payout initiated by a mobile device 110 during the operational time period. The payout data object may thereafter be analyzed to flag the transaction as an authorized transaction or unauthorized transaction, as described herein. In this way, the techniques of the present disclosure may improve cash accountability for all POS terminals 140 including POS terminals 140 that do not include networking infrastructure to provide transaction data to the CHD 130 and/or monitoring server 120 in real time.

Example User Interfaces

The user interface screens illustrated in FIGS. 7-13 are provided to facilitate a cash payout flow for initiating a physical cash payout through a mobile device 110, including (e.g., together with the monitoring server 120) recording payout data for verifying and performing a physical cash payout and providing access credentials for accessing cash from a CHD 130 and/or one or more register tills positioned at various locations throughout an establishment.

The user interface screens are provided as just one set of examples. The mobile device is configured to generate and/or select user interface screens based at least in part on a user's privilege level, user input provided throughout the payout flow process, payout criteria for an establishment, an intended recipient of the physical cash payout, and/or the like. For example, the user interface screens may be rearranged and/or branch out from each other to form a plurality of payout flow processes in which each user interface screen may depend on user input provided in a preceding user interface screen. At each user interface screen, data may be displayed for gathering payout criteria for a payout flow process specific to an organization, an establishment thereof, and/or one or more procedures, guidelines, and/or the like of the organization or establishment. Thus, each user interface screen and/or the order in which each user interface screen is displayed may be based at least in part on the organization and the payout criteria for the organization.

During a particular payout flow (e.g., according to the payout criteria of a particular organization), a plurality of user interfaces may be displayed in series. Each consecutively displayed user interface screen is displayed in response to a request generated at the mobile device 110 and/or the monitoring server 120. The request may comprise or may be embodied as user input received at the mobile device 110 via a prior user interface, wherein the user input is provided to complete the tasks of the previous user interface. Thus, as the user provides user input on a previous user interface screen, the mobile device 110 requests (e.g., from an internal memory, from the monitoring server 120, and/or the like) the consecutively next user interface screen to be displayed to the user. As discussed herein, the mobile device 110 and/or monitoring server 120 selects and/or retrieves the appropriate display variation for the user interface screen in response to the generated request for the user interface screen.

Figure 7:
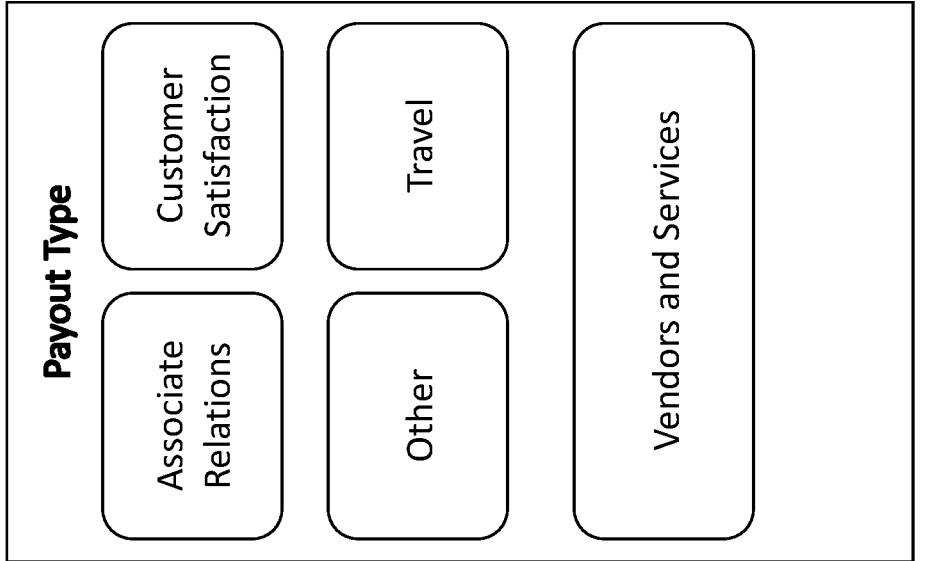
FIGS. 7-13 illustrate example user interfaces that may be generated and provided to a user according to various embodiments.

FIG. 7 specifically illustrates an example user interface screen 700 to be displayed to the user as the user initiates a payout flow process. The user interface screen 700, for example, may include a landing page that allows the user to determine a type of cash payout that needs to be made. The user interface may include one or more selectable options for initiating one or more different types of payout flow processes. The one or more selectable options may be based at least in part on one or more procedures of an organization. For instance, each selectable option may correspond to an approved type of physical cash payout. As shown, approved types of physical cash payouts may include cash payouts for associate relations, customer satisfaction, travel, vendors and services, and/or other extraordinary circumstances. As some examples, physical cash payouts for travel may cover employee travel, such as a pharmacist that may service multiple locations. In addition, or alternatively, physical cash payouts may cover miscellaneous payouts such as those associated with customer satisfaction, vendor payouts, payroll advances, and/or the like.

Figures 8A, 8B:
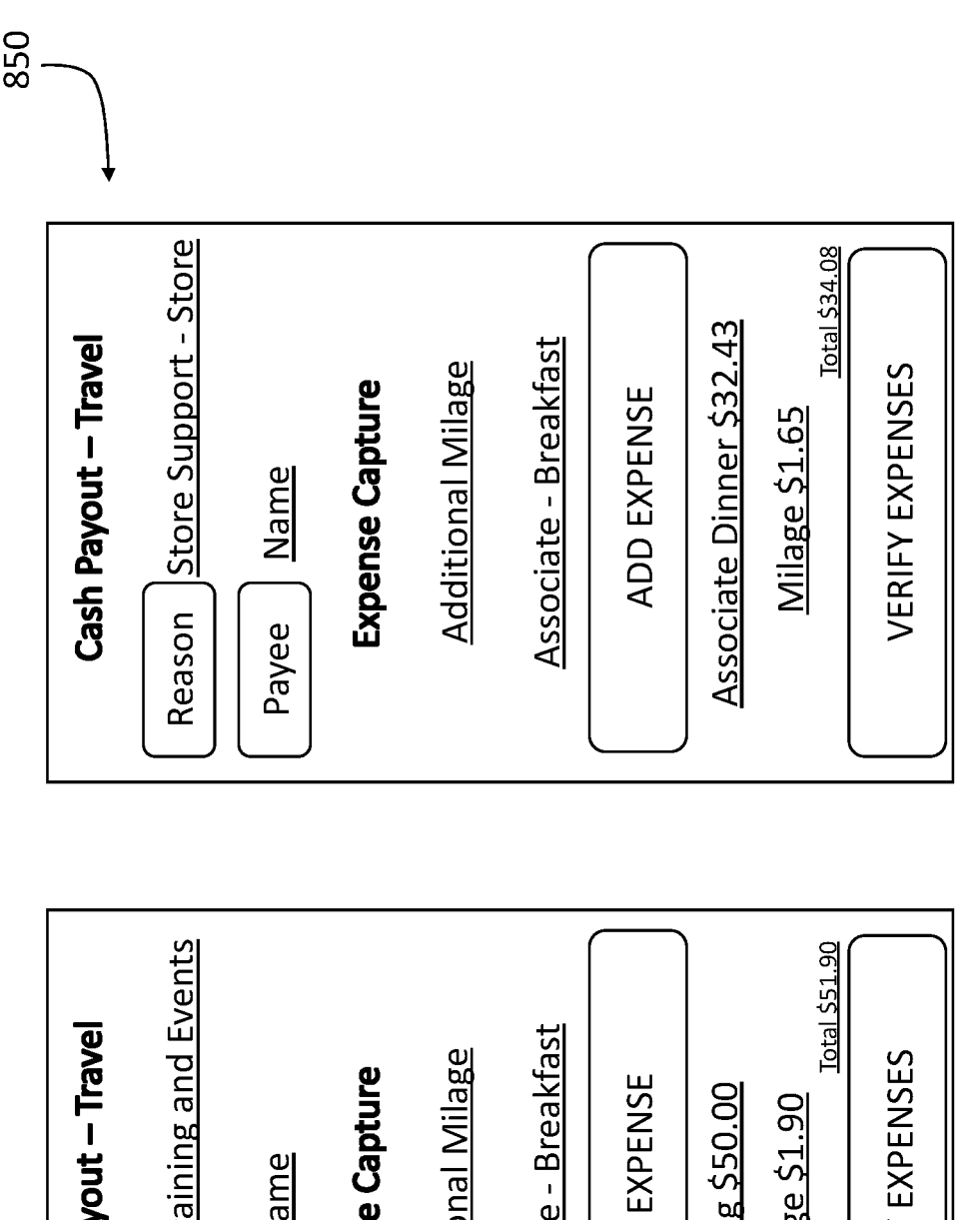

FIGS. 8A-B specifically illustrates example user interface screens 800 and 850 to be displayed to the user after the user selects a type of physical cash payout. The user interface screens 800 and 850 may include expense user interface screens. In some examples, the user interface screens 800 and 850 may be based at least in part on the type of physical cash payout selected in the previous screen. For example, the user interface screens 800 and 850 may be rendered in response to the selection of a travel-based physical cash payout.

The user interface screens 800 and 850 may include selectable options for identifying a reason for the payout, a recipient of the payout, and/or one or more expenses covered by the payout. The user interface screens 800 and 850 may walk a user through the possible expenses associated with a payout of a particular type. The possible expenses for a particular type of payout, for example, may be based at least in part on payout criteria for an organization. As an example, the middle section lists possible items that may be captured for a travel-based cash payout. These, and items for other types of payouts, may be customizable, allowing an enterprise to remove items that are not reimbursable to an entity.

In some examples, the one or more selectable options may be based at least in part on the type of physical cash payout and/or one or more previously selected options from the user interface screens 800 and 850. For example, the one or more expenses covered by the physical cash payout may be dynamically filtered, rearranged, and/or the like, based at least in part on the reason for the payout and/or recipient. In some embodiments, the user interface screens 800 and 850 may include an aggregate section that dynamically builds as the user selects expenses. In this way, a user may view their work as they create a payout record.

Figures 9A, 9B:
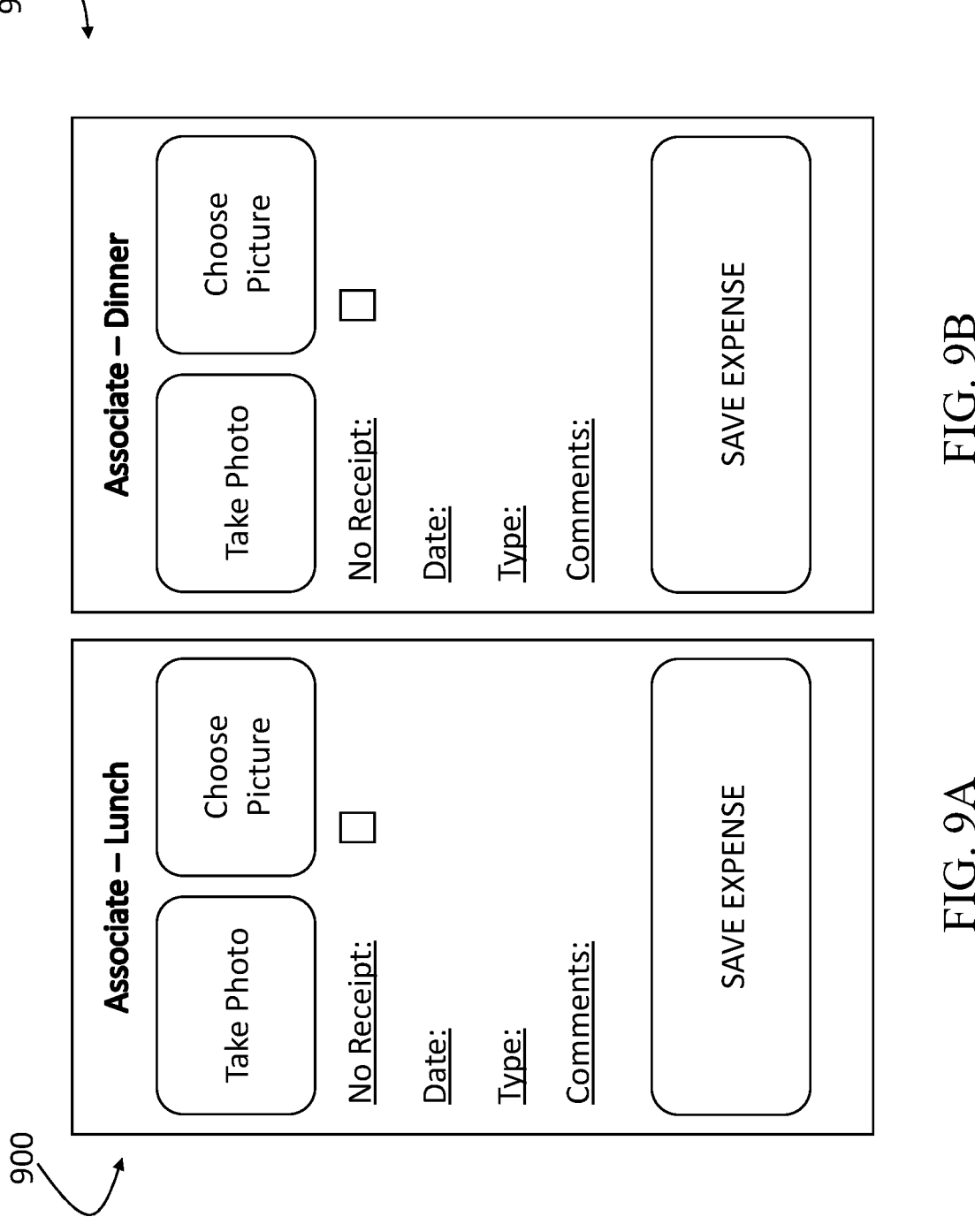

FIGS. 9A-B specifically illustrates example user interface screens 900 and 950 to be displayed to the user after the user selects an expense associated with a receipt and/or any other type of verifying documentation (e.g., parking ticket, quote, etc.). The user interface screens 900 and 950, for example, may display a receipt page for inputting images (e.g., or other type of representation) for verifying an expense. For example, when a user selects an expense type (e.g., through a preceding user interface screen) that requires documentation, the user may be prompted with the user interface screens 900 or 950 to provide documentation for the expense. The user interface screens 900 and 950 may include one or more selectable icons that provide the ability to capture the documentation for the expense with a camera and/or otherwise upload the documentation. By way of example, the user interface screen 900 provides the user the ability to upload a receipt for a lunch, whereas the user interface screen 950 provided the user the ability to upload a receipt for a dinner. In some embodiments, after a user has taken and/or selected a picture, the user interface screens 900 and 950 may automatically update to reflect the image. In some examples, as described herein, the uploaded image may be processed to extract an expense value and verify a manually entered value. In this way, a monitoring server may leverage the image to verify an expense amount.

Figure 10:
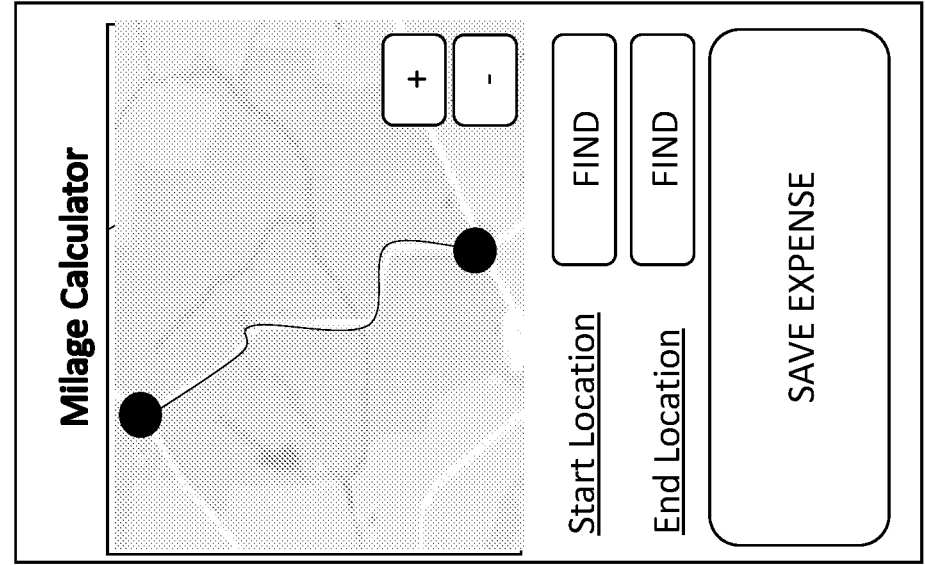

FIG. 10 specifically illustrates an example user interface screen 1000 to be displayed to the user after the user selects a travel-related expense. The user interface screen 1000, for example, may display a travel page for entering and/or calculating mileage for a travel-related expense. In some examples, user interface screen 1000 may include a mileage capture screen that allows a user to input a start and ending location to calculate a mileage between the two points, as described herein.

In some examples, the user interface screen 1000 may load with the end location being the current location of the user based on an assumption that the location where the user is completing this work is where they are currently. By way of example, a mobile device may receive location data (e.g., GPS data, etc.) from one or more location sensors, as described herein. The current location may be determined based at least in part on the location data. For example, the current location may include GPS coordinates for the user.

In some examples, the user interface screen 1000 may load with the start location being an assigned location for a user. By way of example, a user may be associated with an assigned location (e.g., a retail establishment, warehouse, etc.). The assigned location, for example, may be stored in a user profile for the user. The assigned location may be manually set by the user, assigned by an organization, or automatically determined based on user activity (e.g., based on historical location data, etc.). In some embodiments, the assigned location for the user is used as a default starting location for a travel-related expense.

In some examples, the user has in and around mileage, there may be a separate expense type of additional mileage which will allow the user to enter user input reflecting mileage or starting and ending odometer readings to calculate the additional mileage.

Figure 11:
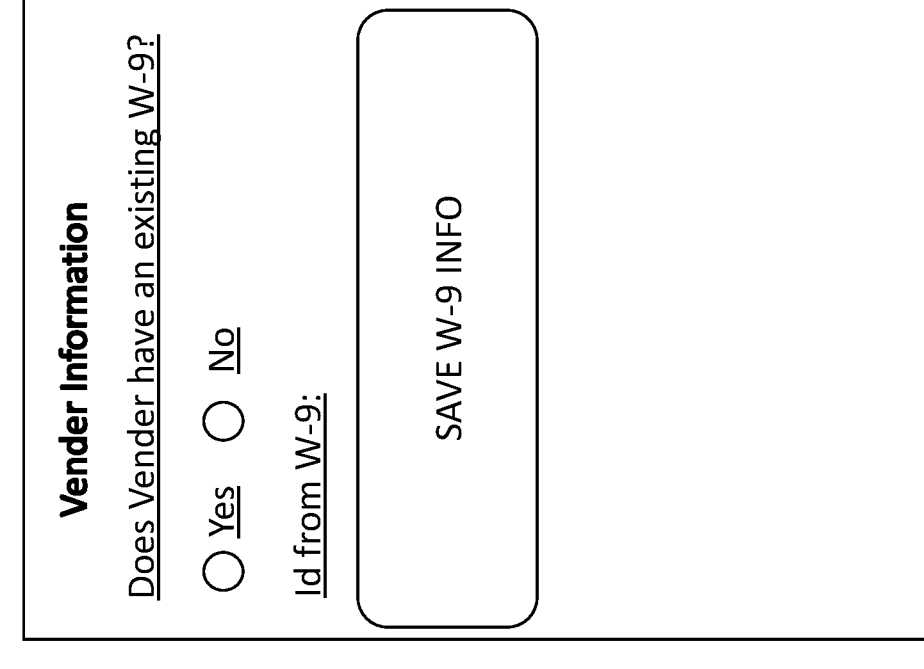

FIG. 11 specifically illustrates an example user interface screen 1100 to be displayed to the user after the user selects a vendor related expense. The user interface screen 1100 may include a vendor page for entering information for a payee in a vendor related payout. For example, to ensure that vendors who provide contract work through service or products properly pay taxes, a tax document, such as a W-9 must be on record for a vendor. In some embodiments, if a payout type for an expense is flagged as a vendor product or service that requires a tax document, the user interface screen 1100 may be displayed to confirm and/or upload the required tax documents for the vendor.

Figure 12:
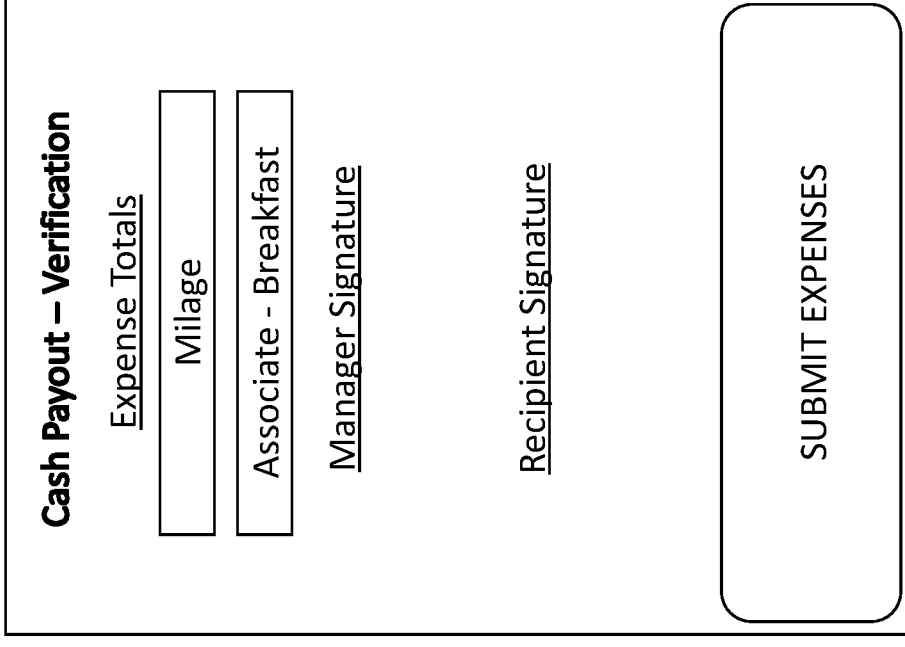
Figure 13:
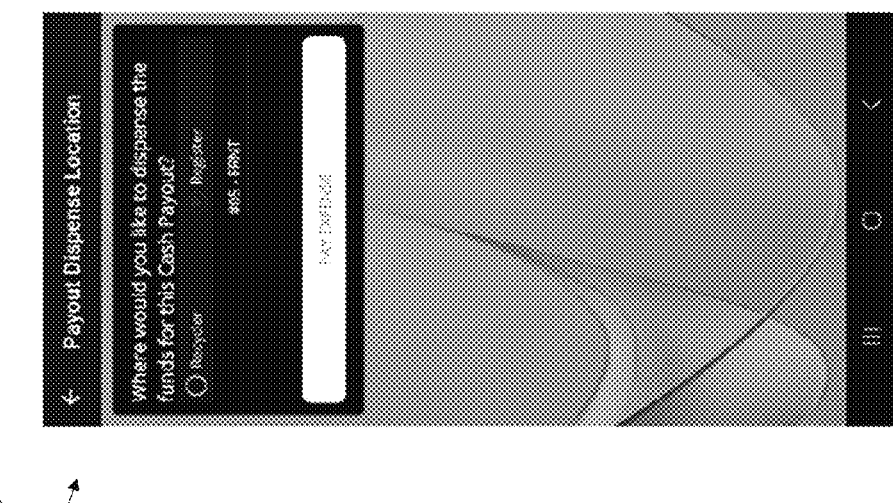
Figure 13:
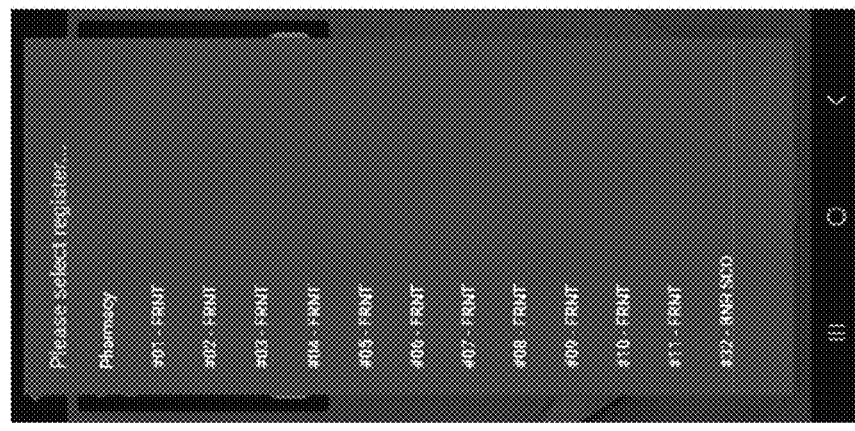
Figure 13:
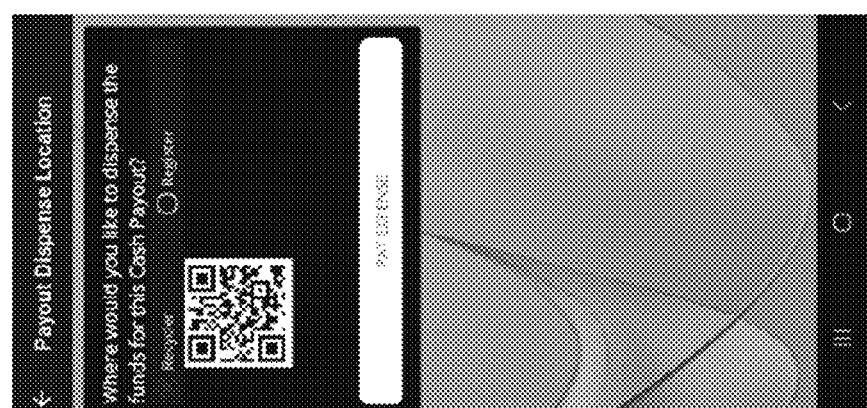
Figure 13:
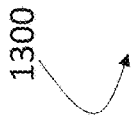

FIG. 12 specifically illustrates an example user interface screen 1200 to be displayed after the user selects one or more expenses for a cash payout. For example, the user interface screen 1200 may include a verification page that displays a summary of a physical cash payout, a payor signature block, and/or a payee signature block. The user interface screen 1200 may be used to provide the parties to a physical cash payout (e.g., a manager, associate, customer, vendor, etc.) with an overview of the selected expenses and/or a verified payout value that will be dispensed for the user. In some embodiments, the example user interface screen 1200 may include a user input portion for receiving signatures for both parties and will not allow the flow to proceed without both parties signing the form.

FIGS. 13A-C specifically illustrate example user interface screens 1300, 1325, and 1350 to be displayed after a physical cash payout is verified (e.g., by one or signature via a preceding user interface screen, etc.). For example, the user interface screens 1300, 1325, and 1350 may include a dispense payout page that describes one or more potential locations for receiving a cash payout. The dispense payout screen enables a user to provide a cash payment where they are currently located rather than requiring them to go back to the office to dispense the cash from a CHD. If the user wishes to use the CHD, access instructions, such as a QR code, may be generated, as reflected by user interface screen 1300, to provide to the CHD with the information about the cash payout so that the CHD is able to match a pending payout and dispense the cash without any additional information other than logging into the mobile device. Options such as requiring two users to authenticate can be added for specific payout types or amounts to prevent misuse of the system. If the user would prefer to dispense the cash from a register till (e.g., for customer satisfaction, returns, etc.), the user may select a register till from a list of available register tills within an enterprise, as reflected by user interface screen 1320, to perform the physical cash payout. In such a case, the monitoring server may create a transaction that may be pulled by the cash handler device which would perform one or more virtual actions. As described herein, the one or more virtual actions may include a virtual skim (e.g, pick-up) from the register till and/or a virtual cash payout for the payout. As reflected by user interface screen 1350, the selected register till may be displayed to the user.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An automated system for simulating interactions between a cash handling device (CHD) and one or more register tills for a physical cash payout, the automated system comprising one or more non-transitory memory storage areas and one or more processors collectively configured to:
   receive payout data for the physical cash payout for a user, wherein the payout data comprises at least one register till identifier corresponding to at least one register till of the one or more register tills;
   generate, based at least in part on the payout data, a simulated interaction between the CHD and the at least one register till, wherein the simulated interaction comprises:
      (i) a simulated pick-up transaction for the at least one register till, wherein the simulated pick-up transaction reflects a pick-up operation from the at least one register till, and (ii) a simulated payout transaction for the CHD, wherein the simulated payout transaction reflects a payout operation from the CHD; and cause, based at least in part on the payout data, the at least one register till to: dispense cash to satisfy the physical cash payout or unlock access to cash stored within the at least one register till.

2. The automated system of claim 1, wherein the one or more non-transitory memory storage areas and the one or more processors are further configured to transmit one or more cash dispensing instructions to the at least one register till to cause the at least one register till to: dispense cash to satisfy the physical cash payout or unlock access to cash stored within the at least one register till.

3. The automated system of claim 2, wherein the one or more cash dispensing instructions identify access credentials, and wherein the one or more non-transitory memory storage areas and the one or more processors are further configured to generate access instructions that reflect the access credentials and transmit the access instructions to a mobile device.

4. The automated system of claim 1, wherein the payout data is associated with an organizational identifier, and wherein the one or more non-transitory memory storage areas and the one or more processors are further configured to:

generate a payout data object based at least in part on the payout data and the simulated interaction; and store, using the organizational identifier, the payout data object in an encrypted data store.

5. The automated system of claim 1, wherein receiving the payout data comprises:

causing, via a mobile device, a presentation of a plurality of user interfaces to the user, wherein each of the plurality of user interfaces corresponds to one or more payout criteria for validating the physical cash payout; and receiving the payout data from the mobile device in response to user input to the plurality of user interfaces.

6. The automated system of claim 5, wherein the plurality of user interfaces comprise at least one verification user interface that displays a summary of the physical cash payout, a payor signature block, and a payee signature block, and wherein the payout data comprises verification data that reflects a payor signature entered via the payor signature block and a payee signature entered via the payee signature block.

7. The automated system of claim 1, wherein the payout data comprises a user input payout value and image data that reflects an actual payout value, and wherein the one or more non-transitory memory storage areas and the one or more processors are further configured to:

extract, using one or more optical character recognition models, the actual payout value from the image data; and verify, based at least in part on the actual payout value, the user input payout value.

8. The automated system of claim 1, wherein the payout data comprises location data that reflects a start location and an end location for the physical cash payout, and wherein the one or more non-transitory memory storage areas and the one or more processors are further configured to:

determine, based at least in part on map data, a covered distance between the start location and the end location;

determine a payout value for the physical cash payout based at least in part on the covered distance;

generate the simulated interaction based at least in part on the payout value; and cause, based at least in part on the payout value, the at least one register till to: dispense cash to satisfy the physical cash payout or unlock access to cash stored within the at least one register till.

9. The automated system of claim 8, wherein the location data comprises current location data that reflects a user's current location, and wherein the current location data is generated by one or more location sensors of a mobile device.

10. The automated system of claim 9, wherein the one or more non-transitory memory storage areas and the one or more processors are further configured to determine the end location based at least in part on the current location data.

11. A computer-implemented method for simulating interactions between a cash handling device (CHD) and one or more register tills for a physical cash payout, the computer-implemented method comprising:

receiving payout data for the physical cash payout for a user, wherein the payout data comprises at least one register till identifier corresponding to at least one register till of the one or more register tills;

generating, based at least in part on the payout data, a simulated interaction between the CHD and the at least one register till, wherein the simulated interaction comprises:

(i) a simulated pick-up transaction for the at least one register till, wherein the simulated pick-up transaction reflects a pick-up operation from the at least one register till, and (ii) a simulated payout transaction for the CHD, wherein the simulated payout transaction reflects a payout operation from the CHD; and causing, based at least in part on the payout data, the at least one register till to: dispense cash to satisfy the physical cash payout or unlock access to cash stored within the at least one register till.

12. The computer-implemented method of claim 11, wherein receiving the payout data comprises:

causing, via a mobile device, a presentation of a plurality of user interfaces to the user, wherein each of the plurality of user interfaces corresponds to one or more payout criteria for validating the physical cash payout; and receiving the payout data from the mobile device in response to user input to the plurality of user interfaces.

13. The computer-implemented method of claim 12, wherein the plurality of user interfaces comprise at least one verification user interface that displays a summary of the physical cash payout, a payor signature block, and a payee signature block, and wherein the payout data comprises verification data that reflects a payor signature entered via the payor signature block and a payee signature entered via the payee signature block.

14. The computer-implemented method of claim 11, wherein the payout data comprises a user input payout value and image data that reflects an actual payout value, and wherein the computer-implemented method further comprises:

extracting, using one or more optical character recognition models, the actual payout value from the image data; and verifying, based at least in part on the actual payout value, the user input payout value.

15. A computer program product comprising a non-transitory computer readable medium having computer program instructions stored therein, the computer program instructions when executed by a processor, cause the processor to:

receive payout data for a physical cash payout for a user, wherein the payout data comprises at least one register till identifier corresponding to at least one register till of one or more register tills within an establishment;

generate, based at least in part on the payout data, a simulated interaction between the CHD and the at least one register till, wherein the simulated interaction comprises:

(i) a simulated pick-up transaction for the at least one register till, wherein the simulated pick-up transaction reflects a pick-up operation from the at least one register till, and (ii) a simulated payout transaction for the CHD, wherein the simulated payout transaction reflects a payout operation from the CHD; and cause, based at least in part on the payout data, the at least one register till to: dispense cash to satisfy the physical cash payout or unlock access to cash stored within the at least one register till.

16. The computer program product of claim 15, wherein the computer program instructions, when executed by the processor, further cause the processor to transmit one or more cash dispensing instructions to the at least one register till to cause the at least one register till to: dispense cash to satisfy the physical cash payout or unlock access to cash stored within the at least one register till.

17. The computer program product of claim 16, wherein the one or more cash dispensing instructions identify access credentials, and wherein the computer program instructions, when executed by the processor, further cause the processor to generate access instructions that reflect the access credentials and transmit the access instructions to a mobile device.

18. The computer program product of claim 15, wherein the payout data is associated with an organizational identifier, and wherein the computer program instructions, when executed by the processor, further cause the processor to:

generate a payout data object based at least in part on the payout data and the simulated interaction; and store, using the organizational identifier, the payout data object in an encrypted data store.

19. The computer program product of claim 15, wherein the payout data comprises location data that reflects a start location and an end location for the physical cash payout, and wherein the computer program instructions, when executed by the processor, further cause the processor to:

determine, based at least in part on map data, a covered distance between the start location and the end location;

determine a payout value for the physical cash payout based at least in part on the covered distance;

generate the simulated interaction based at least in part on the payout value; and cause, based at least in part on the payout value, the at least one register till to: dispense cash to satisfy the physical cash payout or unlock access to cash stored within the at least one register till.

20. The computer program product of claim 19, wherein the location data comprises current location data that reflects a user's current location, and wherein the current location data is generated by one or more location sensors of a mobile device.

\*   \*   \*   \*   \*